US010938758B2

(12) United States Patent
Allen et al.

(10) Patent No.: US 10,938,758 B2
(45) Date of Patent: Mar. 2, 2021

(54) GENERATING AND DISPLAYING CUSTOMIZED AVATARS IN MEDIA OVERLAYS

(71) Applicant: Snap Inc., Santa Monica, CA (US)

(72) Inventors: Nicholas Richard Allen, Venice, CA (US); Dorian Franklin Baldwin, Toronto (CA); Jacob Edward Blackstock, Toronto (CA); David James Kennedy, Toronto (CA); Shahan Panth, Toronto (CA); Timothy Jordan Garcia, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 15/369,499

(22) Filed: Dec. 5, 2016

(65) Prior Publication Data

US 2018/0113587 A1    Apr. 26, 2018

Related U.S. Application Data

(60) Provisional application No. 62/412,115, filed on Oct. 24, 2016.

(51) Int. Cl.
| | |
|---|---|
| *G06F 3/00* | (2006.01) |
| *H04L 12/58* | (2006.01) |
| *H04W 4/80* | (2018.01) |
| *G06K 9/00* | (2006.01) |
| *H04L 29/08* | (2006.01) |

(Continued)

(52) U.S. Cl.
CPC ............ *H04L 51/08* (2013.01); *G06F 3/0484* (2013.01); *G06K 9/00751* (2013.01); *G06T 13/80* (2013.01); *H04L 51/063* (2013.01); *H04L 67/18* (2013.01); *H04W 4/80* (2018.02)

(58) Field of Classification Search
CPC ... H04W 4/80; G06F 3/0484; G06K 9/00751; G06T 13/80; H04L 67/18
See application file for complete search history.

(56) References Cited

U.S. PATENT DOCUMENTS

| | | |
|---|---|---|
| 5,826,269 A | 10/1998 | Hussey |
| 5,880,731 A | 3/1999 | Liles et al. |

(Continued)

FOREIGN PATENT DOCUMENTS

| | | |
|---|---|---|
| CA | 2887596 A1 | 7/2015 |
| CN | 108885795 A | 11/2018 |

(Continued)

OTHER PUBLICATIONS

"U.S. Appl. No. 13/979,974, Response filed Jan. 13, 2018 to Non Final Office Action dated Oct. 3, 2017", 8 pgs.

(Continued)

*Primary Examiner* — Kyle R Stork
(74) *Attorney, Agent, or Firm* — Schwegman Lundberg & Woessner, P.A.

(57) ABSTRACT

Among other things, embodiments of the present disclosure improve the functionality of electronic messaging and imaging software and systems by generating and displaying media overlays with avatars of different users. For example, media overlays can be generated by the system and displayed in conjunction with media content (e.g., images and/or video) generated by an image-capturing device (e.g., a digital camera).

21 Claims, 11 Drawing Sheets

(51) Int. Cl.
 *G06F 3/0484* (2013.01)
 *G06T 13/80* (2011.01)

(56) References Cited

U.S. PATENT DOCUMENTS

| | | | |
|---|---|---|---|
| 6,023,270 A | 2/2000 | Brush, II et al. |
| 6,038,295 A | 3/2000 | Mattes |
| 6,223,165 B1 | 4/2001 | Lauffer |
| 6,233,318 B1 | 5/2001 | Picard et al. |
| 6,283,858 B1 | 9/2001 | Hayes, Jr. et al. |
| 6,374,292 B1 | 4/2002 | Srivastava et al. |
| 6,473,794 B1 | 10/2002 | Guheen et al. |
| 6,772,195 B1 | 8/2004 | Hatlelid et al. |
| 6,839,411 B1 | 1/2005 | Saltanov et al. |
| 6,842,779 B1 | 1/2005 | Nishizawa |
| 6,980,909 B2 | 12/2005 | Root et al. |
| 7,073,129 B1 | 7/2006 | Robarts et al. |
| 7,079,158 B2 | 7/2006 | Lambertsen |
| 7,173,651 B1 | 2/2007 | Knowles |
| 7,280,123 B2 | 10/2007 | Bentley et al. |
| 7,342,587 B2 | 3/2008 | Danzig et al. |
| 7,411,493 B2 | 8/2008 | Smith |
| 7,468,729 B1 | 12/2008 | Levinson |
| 7,535,469 B2 | 5/2009 | Kim et al. |
| 7,535,890 B2 | 5/2009 | Rojas |
| 7,627,828 B1 | 12/2009 | Collison et al. |
| 7,636,755 B2 | 12/2009 | Blattner et al. |
| 7,639,251 B2 | 12/2009 | Gu et al. |
| 7,689,649 B2 | 3/2010 | Heikes et al. |
| 7,711,155 B1 | 5/2010 | Sharma et al. |
| 7,775,885 B2 | 8/2010 | Van Luchene et al. |
| 7,792,789 B2 | 9/2010 | Prahlad et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,077,931 B1 | 12/2011 | Chatman et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,131,597 B2 | 3/2012 | Hudetz |
| 8,146,005 B2 | 3/2012 | Jones et al. |
| 8,151,191 B2 | 4/2012 | Nicol |
| 8,170,957 B2 | 5/2012 | Richard |
| 8,199,747 B2 | 6/2012 | Rojas et al. |
| 8,332,475 B2 | 12/2012 | Rosen et al. |
| 8,384,719 B2 | 2/2013 | Reville et al. |
| RE44,054 E | 3/2013 | Kim |
| 8,396,708 B2 | 3/2013 | Park et al. |
| 8,413,059 B2 | 4/2013 | Lee et al. |
| 8,425,322 B2 | 4/2013 | Gillo et al. |
| 8,457,367 B1 | 6/2013 | Sipe et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,570,326 B2 | 10/2013 | Gorev |
| 8,581,911 B2 | 11/2013 | Becker et al. |
| 8,597,121 B2 | 12/2013 | Andres Del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,700,012 B2 | 4/2014 | Ferren et al. |
| 8,718,333 B2 | 5/2014 | Wolf et al. |
| 8,724,622 B2 | 5/2014 | Rojas |
| 8,730,231 B2 | 5/2014 | Snoddy et al. |
| 8,738,719 B2 | 5/2014 | Lee et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,874,677 B2 | 10/2014 | Rosen et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,924,250 B2 | 12/2014 | Bates et al. |
| 8,935,656 B2 | 1/2015 | Dandia et al. |
| 8,963,926 B2 | 2/2015 | Brown et al. |
| 8,989,786 B2 | 3/2015 | Feghali |
| 8,995,433 B2 | 3/2015 | Rojas |
| 9,040,574 B2 | 5/2015 | Wang et al. |
| 9,055,416 B2 | 6/2015 | Rosen et al. |
| 9,086,776 B2 | 7/2015 | Ye et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,135,726 B2 | 9/2015 | Kafuku |
| 9,191,776 B2 | 11/2015 | Root et al. |
| 9,204,252 B2 | 12/2015 | Root |
| 9,224,220 B2 | 12/2015 | Toyoda et al. |
| 9,241,184 B2 | 1/2016 | Weerasinghe |
| 9,256,860 B2 | 2/2016 | Herger et al. |
| 9,285,951 B2 | 3/2016 | Makofsky et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,392,308 B2 | 7/2016 | Ahmed et al. |
| 9,402,057 B2 | 7/2016 | Kaytaz et al. |
| 9,412,192 B2 | 8/2016 | Mandel et al. |
| 9,443,227 B2 | 9/2016 | Evans et al. |
| 9,460,541 B2 | 10/2016 | Li et al. |
| 9,480,924 B2 | 11/2016 | Haslam |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,641,870 B1 * | 5/2017 | Cormie ............ H04N 21/23424 |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,121,055 B1 | 11/2018 | Savvides et al. |
| 10,127,945 B2 | 11/2018 | Ho et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,339,365 B2 | 7/2019 | Gusarov et al. |
| 10,360,708 B2 | 7/2019 | Bondich et al. |
| 10,362,219 B2 | 7/2019 | Wilson et al. |

(56) References Cited

U.S. PATENT DOCUMENTS

| | | |
|---|---|---|
| 10,375,519 B2 | 8/2019 | Pai et al. |
| 10,382,378 B2 | 8/2019 | Garcia et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0035607 A1 | 3/2002 | Checkoway et al. |
| 2002/0059193 A1 | 5/2002 | Decime |
| 2002/0067362 A1 | 6/2002 | Agostino Nocera et al. |
| 2002/0169644 A1 | 11/2002 | Greene |
| 2003/0206171 A1 | 11/2003 | Kim et al. |
| 2005/0143136 A1 | 6/2005 | Lev et al. |
| 2005/0144241 A1 | 6/2005 | Stata et al. |
| 2005/0162419 A1 | 7/2005 | Kim et al. |
| 2005/0206610 A1 | 9/2005 | Cordelli |
| 2005/0280660 A1* | 12/2005 | Seo .................. H04M 1/72544 345/629 |
| 2006/0031412 A1 | 2/2006 | Adams et al. |
| 2006/0145944 A1 | 7/2006 | Tarlton et al. |
| 2006/0294465 A1 | 12/2006 | Ronen et al. |
| 2007/0011270 A1 | 1/2007 | Klein et al. |
| 2007/0113181 A1 | 5/2007 | Blattner et al. |
| 2007/0168863 A1 | 7/2007 | Blattner et al. |
| 2007/0174273 A1 | 7/2007 | Jones et al. |
| 2007/0176921 A1 | 8/2007 | Iwasaki et al. |
| 2007/0218987 A1 | 9/2007 | Luchene et al. |
| 2007/0258656 A1 | 11/2007 | Aarabi et al. |
| 2007/0260984 A1 | 11/2007 | Marks et al. |
| 2008/0097979 A1 | 4/2008 | Heidloff et al. |
| 2008/0158222 A1 | 7/2008 | Li et al. |
| 2008/0201638 A1 | 8/2008 | Nair |
| 2008/0209329 A1 | 8/2008 | Defranco et al. |
| 2008/0216092 A1 | 9/2008 | Serlet |
| 2008/0222108 A1 | 9/2008 | Prahlad et al. |
| 2008/0309617 A1 | 12/2008 | Kong et al. |
| 2009/0013268 A1 | 1/2009 | Amit |
| 2009/0016617 A1 | 1/2009 | Bregman-amitai et al. |
| 2009/0030884 A1 | 1/2009 | Pulfer et al. |
| 2009/0044113 A1 | 2/2009 | Jones et al. |
| 2009/0047972 A1 | 2/2009 | Neeraj |
| 2009/0055484 A1 | 2/2009 | Vuong et al. |
| 2009/0070688 A1 | 3/2009 | Gyorfi et al. |
| 2009/0087035 A1 | 4/2009 | Wen et al. |
| 2009/0089710 A1 | 4/2009 | Wood et al. |
| 2009/0099925 A1 | 4/2009 | Mehta et al. |
| 2009/0100367 A1 | 4/2009 | Dargahi et al. |
| 2009/0106672 A1 | 4/2009 | Burstrom |
| 2009/0144639 A1 | 6/2009 | Nims et al. |
| 2009/0150778 A1 | 6/2009 | Nicol |
| 2009/0153552 A1 | 6/2009 | Fidaleo et al. |
| 2009/0158170 A1 | 6/2009 | Narayanan et al. |
| 2009/0175521 A1 | 7/2009 | Shadan et al. |
| 2009/0177976 A1 | 7/2009 | Bokor et al. |
| 2009/0202114 A1 | 8/2009 | Morin et al. |
| 2009/0228811 A1 | 9/2009 | Adams et al. |
| 2009/0254840 A1 | 10/2009 | Churchill et al. |
| 2009/0254859 A1 | 10/2009 | Arrasvuori et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2009/0319178 A1* | 12/2009 | Khosravy .......... G06Q 30/0241 701/408 |
| 2009/0328122 A1* | 12/2009 | Amento ............. H04N 7/17318 725/114 |
| 2010/0011422 A1 | 1/2010 | Mason et al. |
| 2010/0023885 A1 | 1/2010 | Reville et al. |
| 2010/0073458 A1 | 3/2010 | Pace |
| 2010/0083138 A1 | 4/2010 | Dawson et al. |
| 2010/0083140 A1 | 4/2010 | Dawson et al. |
| 2010/0083148 A1 | 4/2010 | Finn et al. |
| 2010/0100828 A1 | 4/2010 | Khandelwal et al. |
| 2010/0115426 A1 | 5/2010 | Liu et al. |
| 2010/0121915 A1 | 5/2010 | Wang |
| 2010/0146407 A1 | 6/2010 | Bokor et al. |
| 2010/0153868 A1 | 6/2010 | Allen et al. |
| 2010/0162149 A1 | 6/2010 | Sheleheda et al. |
| 2010/0179991 A1 | 7/2010 | Lorch et al. |
| 2010/0185640 A1 | 7/2010 | Dettinger et al. |
| 2010/0197396 A1 | 8/2010 | Fujii et al. |
| 2010/0203968 A1 | 8/2010 | Gill et al. |
| 2010/0227682 A1 | 9/2010 | Reville et al. |
| 2010/0274724 A1 | 10/2010 | Bible, Jr. et al. |
| 2010/0290756 A1* | 11/2010 | Karaoguz .......... G06Q 30/0637 386/239 |
| 2010/0332980 A1 | 12/2010 | Sun et al. |
| 2011/0022965 A1 | 1/2011 | Lawrence et al. |
| 2011/0047404 A1 | 2/2011 | Metzler et al. |
| 2011/0047505 A1 | 2/2011 | Fillion et al. |
| 2011/0066664 A1 | 3/2011 | Goldman et al. |
| 2011/0093780 A1 | 4/2011 | Dunn |
| 2011/0113323 A1 | 5/2011 | Fillion et al. |
| 2011/0115798 A1 | 5/2011 | Nayar et al. |
| 2011/0148864 A1 | 6/2011 | Lee et al. |
| 2011/0153759 A1 | 6/2011 | Rathod |
| 2011/0161076 A1 | 6/2011 | Davis et al. |
| 2011/0202598 A1 | 8/2011 | Evans et al. |
| 2011/0238762 A1 | 9/2011 | Soni et al. |
| 2011/0239136 A1 | 9/2011 | Goldman et al. |
| 2011/0239143 A1 | 9/2011 | Ye et al. |
| 2011/0246330 A1 | 10/2011 | Tikku et al. |
| 2011/0248992 A1 | 10/2011 | Van Os et al. |
| 2011/0249891 A1 | 10/2011 | Li |
| 2011/0285703 A1 | 11/2011 | Jin |
| 2011/0292051 A1 | 12/2011 | Nelson et al. |
| 2012/0013770 A1* | 1/2012 | Stafford ................ H04N 5/272 348/239 |
| 2012/0015673 A1 | 1/2012 | Klassen et al. |
| 2012/0069028 A1 | 3/2012 | Bouguerra |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0139830 A1 | 6/2012 | Hwang et al. |
| 2012/0209924 A1 | 8/2012 | Evans et al. |
| 2012/0215879 A1 | 8/2012 | Bozo |
| 2012/0223940 A1 | 9/2012 | Dunstan et al. |
| 2012/0229506 A1 | 9/2012 | Nishikawa |
| 2012/0290977 A1 | 11/2012 | Devecka |
| 2012/0309520 A1 | 12/2012 | Evertt et al. |
| 2012/0315987 A1 | 12/2012 | Walling |
| 2013/0103760 A1 | 4/2013 | Golding et al. |
| 2013/0103766 A1 | 4/2013 | Gupta |
| 2013/0152000 A1 | 6/2013 | Liu et al. |
| 2013/0155169 A1 | 6/2013 | Hoover et al. |
| 2013/0179520 A1 | 7/2013 | Lee et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0258040 A1 | 10/2013 | Kaytaz et al. |
| 2013/0260800 A1 | 10/2013 | Asakawa et al. |
| 2014/0011576 A1 | 1/2014 | Barbalet et al. |
| 2014/0040066 A1 | 2/2014 | Fujioka |
| 2014/0043329 A1 | 2/2014 | Wang et al. |
| 2014/0055554 A1 | 2/2014 | Du et al. |
| 2014/0085293 A1 | 3/2014 | Konoplev et al. |
| 2014/0095293 A1 | 4/2014 | Abhyanker |
| 2014/0125678 A1 | 5/2014 | Wang et al. |
| 2014/0128166 A1 | 5/2014 | Tam et al. |
| 2014/0129343 A1 | 5/2014 | Finster et al. |
| 2014/0160149 A1* | 6/2014 | Blackstock ............ G06N 3/006 345/619 |
| 2014/0176662 A1 | 6/2014 | Goodman |
| 2014/0221089 A1 | 8/2014 | Fortkort |
| 2014/0306884 A1 | 10/2014 | Sano et al. |
| 2014/0347368 A1 | 11/2014 | Kishore et al. |
| 2014/0362091 A1 | 12/2014 | Bouaziz et al. |
| 2014/0372420 A1 | 12/2014 | Slep |
| 2015/0084984 A1 | 3/2015 | Tomii et al. |
| 2015/0086087 A1 | 3/2015 | Ricanek, Jr. et al. |
| 2015/0088464 A1 | 3/2015 | Yuen et al. |
| 2015/0121251 A1 | 4/2015 | Kadirvel et al. |
| 2015/0123967 A1 | 5/2015 | Quinn et al. |
| 2015/0169938 A1 | 6/2015 | Yao et al. |

(56) References Cited

U.S. PATENT DOCUMENTS

| | | |
|---|---|---|
| 2015/0172393 A1 | 6/2015 | Oplinger et al. |
| 2015/0193522 A1 | 7/2015 | Choi et al. |
| 2015/0193819 A1 | 7/2015 | Chang |
| 2015/0195235 A1 | 7/2015 | Trussel et al. |
| 2015/0206349 A1 | 7/2015 | Rosenthal et al. |
| 2015/0213604 A1 | 7/2015 | Li et al. |
| 2015/0220774 A1 | 8/2015 | Ebersman et al. |
| 2015/0232065 A1 | 8/2015 | Ricci et al. |
| 2015/0234942 A1 | 8/2015 | Harmon |
| 2015/0264432 A1 | 9/2015 | Cheng |
| 2015/0279098 A1 | 10/2015 | Kim et al. |
| 2015/0295866 A1 | 10/2015 | Collet et al. |
| 2015/0304806 A1 | 10/2015 | Vincent |
| 2016/0045834 A1 | 2/2016 | Burns |
| 2016/0050169 A1 | 2/2016 | Ben Atar et al. |
| 2016/0086500 A1 | 3/2016 | Kaleal, III |
| 2016/0093078 A1 | 3/2016 | Davis et al. |
| 2016/0110922 A1 | 4/2016 | Haring |
| 2016/0134840 A1 | 5/2016 | Mcculloch |
| 2016/0158600 A1 | 6/2016 | Rolley |
| 2016/0163084 A1 | 6/2016 | Corazza et al. |
| 2016/0179297 A1 | 6/2016 | Lundin et al. |
| 2016/0180447 A1 | 6/2016 | Kamalie et al. |
| 2016/0189310 A1 | 6/2016 | O'kane |
| 2016/0210500 A1 | 7/2016 | Feng et al. |
| 2016/0234149 A1 | 8/2016 | Tsuda et al. |
| 2016/0241504 A1 | 8/2016 | Raji et al. |
| 2016/0253807 A1 | 9/2016 | Jones et al. |
| 2016/0275721 A1 | 9/2016 | Park et al. |
| 2016/0292905 A1 | 10/2016 | Nehmadi et al. |
| 2016/0343160 A1 | 11/2016 | Blattner et al. |
| 2016/0357578 A1 | 12/2016 | Kim et al. |
| 2017/0027528 A1 | 2/2017 | Kaleal, III et al. |
| 2017/0039752 A1 | 2/2017 | Quinn et al. |
| 2017/0064240 A1 | 3/2017 | Mangat et al. |
| 2017/0069124 A1 | 3/2017 | Tong et al. |
| 2017/0076011 A1 | 3/2017 | Gannon |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0270970 A1 | 9/2017 | Ho et al. |
| 2017/0286752 A1 | 10/2017 | Gusarov et al. |
| 2017/0310934 A1 | 10/2017 | Du et al. |
| 2017/0312634 A1 | 11/2017 | Ledoux et al. |
| 2017/0324688 A1 | 11/2017 | Collet et al. |
| 2017/0336960 A1 | 11/2017 | Chaudhri et al. |
| 2018/0005420 A1 | 1/2018 | Bondich et al. |
| 2018/0024726 A1 | 1/2018 | Hviding |
| 2018/0047200 A1* | 2/2018 | O'Hara .................. G06T 13/40 |
| 2018/0088777 A1 | 3/2018 | Dazé et al. |
| 2018/0091732 A1 | 3/2018 | Wilson et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0374242 A1 | 12/2018 | Li et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0188920 A1 | 6/2019 | Mcphee et al. |
| 2019/0220932 A1 | 7/2019 | Amitay et al. |
| 2019/0266390 A1 | 8/2019 | Gusarov et al. |
| 2019/0287287 A1 | 9/2019 | Bondich et al. |
| 2019/0386941 A1 | 12/2019 | Baldwin et al. |

FOREIGN PATENT DOCUMENTS

| | | |
|---|---|---|
| CN | 109643370 A | 4/2019 |
| CN | 109863532 A | 6/2019 |
| CN | 110023985 A | 7/2019 |
| CN | 110168478 A | 8/2019 |
| CN | 110799937 | 2/2020 |
| EP | 2184092 A2 | 5/2010 |
| JP | 2001230801 A | 8/2001 |
| JP | 2014006881 | 1/2014 |
| JP | 5497931 B2 | 3/2014 |
| KR | 20040063436 A | 7/2004 |
| KR | 1020050036963 | 4/2005 |
| KR | 20070008417 | 1/2007 |
| KR | 1020120070898 | 7/2012 |
| KR | 20140033088 A | 3/2014 |
| KR | 101445263 B1 | 9/2014 |
| KR | 20160016532 | 2/2016 |
| KR | 20160028028 | 3/2016 |
| KR | 20160051536 | 5/2016 |
| KR | 20170091803 | 8/2017 |
| WO | WO-03094072 A1 | 11/2003 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2017173319 A1 | 10/2017 |
| WO | 2018006053 | 1/2018 |
| WO | 2018081013 A1 | 5/2018 |
| WO | 2018102562 | 6/2018 |
| WO | WO-2018129531 A1 | 7/2018 |
| WO | WO-2018200042 A1 | 11/2018 |
| WO | WO-2018201107 A1 | 11/2018 |
| WO | WO-2019089613 A1 | 5/2019 |

OTHER PUBLICATIONS

"International Application Serial No. PCT US2017 057918, International Search Report dated Jan. 19, 2018", 3 pgs.

"International Application Serial No. PCT US2017 057918, Written Opinion dated Jan. 19, 2018", 7 pgs.

"U.S. Appl. No. 15/199,472, Response filed Jan. 25, 2018 to Non Final Office Action dated Jul. 25, 2017", 13 pgs.

"U.S. Appl. No. 15/199,472, Final Office Action dated Mar. 1, 2018", 31 pgs.

"International Application Serial No. PCT US2017 063981, International Search Report dated Mar. 22, 2018", 3 pgs.

"International Application Serial No. PCT US2017 063981, Written Opinion dated Mar. 22, 2018", 8 pgs.

"U.S. Appl. No. 15/661,953, Non Final Office Action dated Mar. 26, 2018", 6 pgs.

"U.S. Appl. No. 15/086,749, Response filed Apr. 2, 2018 to Final Office Action dated Oct. 31, 2017", 14 pgs.

Broderick, Ryan, "Every thing You Need to Know About Japan's Amazing Photo Booths", [Online] Retrieved from the internet:https: www.buzzfeed.com ryanhatesthis look-how-kawaii-i-am?utm_term=.kra5QwGNZ#.muYoVB7qJ, (Jan. 22, 2016), 1-30.

Chan, Connie, "The Elements of Stickers", [Online] Retrieved from the internet:https: a16z.com Jun. 17, 2016 stickers , (Jun. 20, 2016), 1-15.

"U.S. Appl. No. 12/471,811, Advisory Action dated Mar. 28, 2012", 6 pgs.

"U.S. Appl. No. 12/471,811, Examiner Interview Summary dated Feb. 2, 2012", 3 pgs.

"U.S. Appl. No. 12/471,811, Examiner Interview Summary dated Apr. 18, 2011", 3 pgs.

"U.S. Appl. No. 12/471,811, Examiner Interview Summary dated May 27, 2014", 2 pgs.

"U.S. Appl. No. 12/471,811, Final Office Action dated Dec. 23, 2011", 20 pgs.

"U.S. Appl. No. 12/471,811, Non Final Office Action dated Jan. 13, 2011", 15 pgs.

"U.S. Appl. No. 12/471,811, Non Final Office Action dated Jun. 28, 2011", 26 pgs.

(56) References Cited

OTHER PUBLICATIONS

"U.S. Appl. No. 12/471,811, Non Final Office Action dated Oct. 24, 2014", 21 pgs.
"U.S. Appl. No. 12/471,811, Notice of Allowance dated Apr. 1, 2015", 6 pgs.
"U.S. Appl. No. 12/471,811, Response filed Jan. 26, 2015 to Non Final Office Action dated Oct. 24, 2014", 18 pgs.
"U.S. Appl. No. 12/471,811, Response filed Feb. 23, 2012 to Final Office Action dated Dec. 23, 2011", 12 pgs.
"U.S. Appl. No. 12/471,811, Response filed Mar. 28, 2012 to Advisory Action dated Mar. 28, 2012, 2011", 14 pgs.
"U.S. Appl. No. 12/471,811, Response filed Apr. 13, 2011 to Non Final Office Action dated Jan. 13, 2011", 5 pgs.
"U.S. Appl. No. 12/471,811, Response filed Sep. 28, 2011 to Non Final Office Action dated Jun. 28, 2011", 19 pgs.
"U.S. Appl. No. 13/979,974, Examiner Interview Summary dated Jun. 29, 2017", 3 pgs.
"U.S. Appl. No. 13/979,974, Examiner Interview Summary dated Sep. 15, 2017", 3 pgs.
"U.S. Appl. No. 13/979,974, Final Office Action dated Jun. 9, 2017", 20 pgs.
"U.S. Appl. No. 13/979,974, Final Office Action dated Oct. 12, 2016", 13 pgs.
"U.S. Appl. No. 13/979,974, Non Final Office Action dated Feb. 22, 2017", 17 pgs.
"U.S. Appl. No. 13/979,974, Non Final Office Action dated Apr. 27, 2016", 16 pgs.
"U.S. Appl. No. 13/979,974, Non Final Office Action dated Oct. 3, 2017", 17 pgs.
"U.S. Appl. No. 13/979,974, Response filed May 22, 2017 to Non Final Office Action dated Feb. 22, 2017", 10 pgs.
"U.S. Appl. No. 13/979,974, Response filed Jul. 26, 2016 to Non Final Office Action dated Apr. 27, 2016", 8 pgs.
"U.S. Appl. No. 13/979,974, Response filed Sep. 11, 2017 to Final Office Action dated Jun. 9, 2017", 8 pgs.
"U.S. Appl. No. 13/979,974, Response filed Jan. 12, 2017 to Non Final Office Action dated Apr. 27, 2016", 8 pgs.
"U.S. Appl. No. 14/753,200, Non Final Office Action dated Oct. 11, 2016", 6 pgs.
"U.S. Appl. No. 14/753,200, Notice of Allowance dated Apr. 27, 2017", 7 pgs.
"U.S. Appl. No. 14/753,200, Response filed Feb. 13, 2017 to Non Final Office Action dated Oct. 11, 2016", 9 pgs.
"U.S. Appl. No. 15/086,749, Final Office Action dated Oct. 31, 2017", 15 pgs.
"U.S. Appl. No. 15/086,749, Non Final Office Action dated Mar. 13, 2017", 12 pgs.
"U.S. Appl. No. 15/199,472, Non Final Office Action dated Jul. 25, 2017", 30 pgs.
"International Application Serial No. PCT/CA2013/000454, International Preliminary Report on Patentability dated Nov. 20, 2014", 9 pgs.
"International Application Serial No. PCT/CA2013/000454, International Search Report dated Aug. 20, 2013", 3 pgs.
"International Application Serial No. PCT/CA2013/000454, Written Opinion dated Aug. 20, 2013", 7 pgs.
"International Application Serial No. PCT/US2017/025460, International Search Report dated Jun. 20, 2017", 2 pgs.
"International Application Serial No. PCT/US2017/025460, Written Opinion dated Jun. 20, 2017", 7 pgs.
"International Application Serial No. PCT/US2017/040447, International Search Report dated Oct. 2, 2017", 4 pgs.
"International Application Serial No. PCT/US2017/040447, Written Opinion dated Oct. 2, 2017", 6 pgs.
Chi-Hyoung, Rhee, et al., "Cartoon-like Avatar Generation Using Facial Component Matching", International Journal of Multimedia and Ubiquitous Engineering, (Jul. 30, 2013), 69-78.
Leyden, John, "This SMS will self-destruct in 40 seconds", [Online]. Retrieved from the Internet: <URL: http://www.theregister.co.uk/2005/12/12/stealthtext/, (Dec. 12, 2005), 1 pg.

"U.S. Appl. No. 15 661,953, Response Filed Jun. 26, 2018 to Non Final Office Action dated Mar. 26, 2018", 13 pgs.
"International Application Serial No. PCT US2018 030044, International Search Report dated Jun. 26, 2018", 2 pgs.
"International Application Serial No. PCT US2018 030044, Written Opinion dated Jun. 26, 2018", 6 pgs.
"U.S. Appl. No. 13/979,974, Final Office Action dated Apr. 25, 2018", 18 pgs.
"U.S. Appl. No. 15/086,749, Non Final Office Action dated Apr. 30, 2018", 14 pgs.
"U.S. Appl. No. 13/979,974, Notice of Allowance dated Aug. 10, 2018", 9 pgs.
"U.S. Appl. No. 13/979,974, Response filed Jul. 25, 2018 to Final Office Action dated Apr. 25, 2018", 10 pgs.
"U.S. Appl. No. 15/086,749, Response filed Aug. 29, 2018 to Non Final Office Action dated Apr. 30, 2018", 12 pgs.
"U.S. Appl. No. 15/199,472, Non Final Office Action dated Sep. 21, 2018", 33 pgs.
"U.S. Appl. No. 15/199,472, Response filed Aug. 31, 2018 to Final Office Action dated Mar. 1, 2018", 14 pgs.
"U.S. Appl. No. 15/199,472, Response filed Oct. 17, 2018 to Non Final Office Action dated Sep. 31, 2018", 11 pgs.
"U.S. Appl. No. 15/583,142, Non Final Office Action dated Oct. 25, 2018", 14 pgs.
"U.S. Appl. No. 15/661,953, Examiner Interview Summary dated Nov. 13, 2018", 3 pgs.
"U.S. Appl. No. 15/661,953, Notice of Allowance dated Aug. 10, 2018", 7 pgs.
"U.S. Appl. No. 15/661,953, PTO Response to Rule 312 Communication dated Oct. 30, 2018", 2 pgs.
"U.S. Appl. No. 15/661,953, PTO Response to Rule 312 Communication dated Nov. 7, 2018", 2 pgs.
"U.S. Appl. No. 16/115,259, Preliminary Amendment filed Oct. 18, 2018 t", 6 pgs.
"International Application Serial No. PCT/US2017/025460, International Preliminary Report on Patentability dated Oct. 11, 2018", 9 pgs.
"International Application Serial No. PCT/US2018/000112, International Search Report dated Jul. 20, 2018", 2 pgs.
"International Application Serial No. PCT/US2018/000112, Written Opinion dated Jul. 20, 2018", 4 pgs.
"U.S. Appl. No. 13/979,974, Corrected Notice of Allowability dated Nov. 19, 2018", 2 pgs.
"U.S. Appl. No. 15/086,749, Final Office Action dated Dec. 31, 2018", 14 pgs.
"U.S. Appl. No. 15/199,472, Final Office Action dated Nov. 15, 2018", 37 pgs.
"U.S. Appl. No. 15/365,046, Non Final Office Action dated Dec. 20, 2018", 36 pgs.
"U.S. Appl. No. 15/628,408, Non Final Office Action dated Jan. 2, 2019", 28 pgs.
"U.S. Appl. No. 16/193,938, Preliminary Amendment filed Nov. 27, 2018", 7 pgs.
"International Application Serial No. PCT/US2017/040447, International Preliminary Report on Patentability dated Jan. 10, 2019", 8 pgs.
Petovello, Mark, "How does a GNSS receiver estimate velocity?", URL: <http://insidegnss.com/wp-content/uploads/2018/01/marapr15-SOLUTIONS.pdf>., (Mar.-Apr. 2015), 3 pgs.
"U.S. Appl. No. 15/086,749, Notice of Allowance dated Feb. 26, 2019", 7 pgs.
"U.S. Appl. No. 15/086,749, Response filed Feb. 11, 2019 to Final Office Action dated Dec. 31, 2018", 10 pgs.
"U.S. Appl. No. 15/199,472, Response filed Jan. 15, 2019 to Final Office Action dated Nov. 15, 2018", 14 pgs.
"U.S. Appl. No. 15/583,142, filed Jan. 28, 2019 to Response Filed Non Final Office Action dated Oct. 25, 2018".
"European Application Serial No. 17776809.0, Extended European Search Report dated Feb. 27, 2019", 7 pgs.
"A Guide to Advertising on Campus With Snapchat Geofilters", College Marketing Group, [Online] Retrieved from the Internet : URL: <https://collegemarketinggroup.com/blog/a-guide-toadvertising-on-campus-with-snapchat-geofilters/>, (Jul. 25, 2016).

(56) References Cited

OTHER PUBLICATIONS

"U.S. Appl. No. 15/401,926, Non Final Office Action dated Aug. 6, 2019", 9 pgs.

"U.S. Appl. No. 15/628,408, Response filed Aug. 12, 2019 to Final Office Action dated Jun. 10, 2019", 12 pgs.

"U.S. Appl. No. 16/115,259, Non Final Office Action dated Jul. 30, 2019", 21 pgs.

"European Application Serial No. 17876226.6, Extended European Search Report dated Sep. 5, 2019", 10 pgs.

"International Application Serial No. PCT/US2017/063981, International Preliminary Report on Patentability dated Jun. 13, 2019", 10 pgs.

"Korean Application Serial No. 10-2018-7031055, Notice of Preliminary Rejection dated Aug. 6, 2019", 13 pgs.

Alex, Heath, "What do Snapchat's emojis mean?—Understanding these emojis will turn you into a Snapchat pro", [Online] Retrieved from the Internet : <URL: https://www.businessinsider.com/what-do-snapchats-emojismean-2016-5?international=true&r=US&IR=T>, (May 28, 2016).

Karen, Tumbokon, "Snapchat Update: How to Add Bitmoji to Customizable Geofilters", [Online] Retrieved from the Internet : <URL: https://www.ibtimes.com/snapchat-update-how-add-bitmojicustomizable-geofilters-2448152>, (Nov. 18, 2016).

Sophia, Bernazzani, "A Brief History of Snapchat", [Online] Retrieved from the Internet : <URL: https://blog.hubspot.com/marketing/history-of-snapchat>, (Feb. 10, 2017).

"U.S. Appl. No. 15/401,926, Final Office Action dated Nov. 21, 2019", 9 pgs.

"U.S. Appl. No. 15/401,926, Response filed Nov. 6, 2019 to Non Final Office Action dated Aug. 6, 2019", 10 pgs.

"U.S. Appl. No. 15/628,408, Non Final Office Action dated Oct. 30, 2019", 45 pgs.

"U.S. Appl. No. 15/628,408, Response filed Jan. 30, 2020 to Non Final Office Action dated Oct. 30, 2019", 17 pgs.

"U.S. Appl. No. 15/901,387, Non Final Office Action dated Oct. 30, 2019", 40 pgs.

"U.S. Appl. No. 16/115,259, Final Office Action dated Dec. 16, 2019", 23 pgs.

"U.S. Appl. No. 16/115,259, Response filed Oct. 30, 2019 to Non Final Office Action dated Jul. 30, 2019", 9 pgs.

"U.S. Appl. No. 16/126,869, Non Final Office Action dated Feb. 5, 2020", 7 pgs.

"U.S. Appl. No. 16/193,938, Non Final Office Action dated Jan. 16, 2020", 11 pgs.

"U.S. Appl. No. 16/365,300, Non Final Office Action dated Oct. 30, 2019", 40 pgs.

"U.S. Appl. No. 16/365,300, Response filed Jan. 30, 2020 to Non Final Office Action dated Oct. 30, 2019", 16 pgs.

"U.S. Appl. No. 16/409,390, Non Final Office Action dated Jan. 8, 2020", 14 pgs.

"European Application Serial No. 17776809.0, Communication Pursuant to Article 94(3) EPC dated Dec. 9, 2019", 4 pgs.

"European Application Serial No. 18791925.3, Extended European Search Report dated Jan. 2, 2020", 6 pgs.

"International Application Serial No. PCT/US2018/000112, International Preliminary Report on Patentability dated Nov. 7, 2019", 6 pgs.

"International Application Serial No. PCT/US2018/030044, International Preliminary Report on Patentability dated Nov. 7, 2019", 8 pgs.

"Introducing Google Latitude", Google UK, [Online] Retrieved from the Internet: <URL: https://www.youtube.com/watch?v=XecGMKqiA5A>, [Retrieved on: Oct. 23, 2019], (Feb. 3, 2009), 1 pg.

"Korean Application Serial No. 10-2018-7031055, Response filed Oct. 7, 2019 to Notice of Preliminary Rejection dated Aug. 6, 2019", w/ English Claims, 30 pgs.

Finn, Greg, "Miss Google Latitude? Google Plus With Location Sharing is Now a Suitable Alternative", Cypress North, [Online] Retrieved from the Internet: <URL: https://cypressnorth.com/social-media/miss-google-latitude-google-location-sharing-now-suitable-alternative/>, [Retrieved Oct. 24, 2019], (Nov. 27, 2013), 10 pgs.

Lapenna, Joe, "The Official Google Blog. Check in with Google Latitude", [Online] Retrieved from the internet: <URL: https://web.archive.org/web/20110201201006/https://googleblog.blogspot.com/2011/02/check-in-with-google-latitude.html>, [Retrieved Oct. 23, 2019], (Feb. 1, 2011), 6 pgs.

Zibreg, "How to share your real time location on Google Maps", idownloadblog.com, [Online] Retrieved from the Internet: <URL: https://www.idownloadblog.com/2017/04/12/how-to-share-location-google-maps/>, [Retrieved on: Oct. 23, 2019], (Apr. 12, 2017), 23 pgs.

"U.S. Appl. No. 15/401,926, Response filed Feb. 21, 2020 to Final Office Action dated Nov. 21, 2019", 9 pgs.

"U.S. Appl. No. 16/433,725, Non Final Office Action dated Feb. 27, 2020", 34 pgs.

"Korean Application Serial No. 10-2018-7031055, Office Action dated Feb. 25, 2020", w English Translation, 7 pgs.

"U.S. Appl. No. 15/401,926, Advisory Action dated Mar. 11, 2020", 2 pgs.

"U.S. Appl. No. 16/115,259, Response filed Mar. 13, 2020 to Final Office Action dated Dec. 16, 2019", 9 pgs.

"U.S. Appl. No. 16/193,938, Response filed Mar. 24, 2020 to Non Final Office Action dated Jan. 16, 2020", 10 pgs.

"European Application Serial No. 17776809.0, Response filed Mar. 19, 2020 to Communication Pursuant to Article 94(3) EPC dated Dec. 9, 2019", 25 pgs.

"U.S. Appl. No. 15/401,926, Non Final Office Action dated Mar. 30, 2020", 9 pgs.

"U.S. Appl. No. 16/409,390, Response filed Apr. 2, 2020 to Non Final Office Action dated Jan. 8, 2020", 10 pgs.

"European Application Serial No. 17876226.6, Response filed Mar. 30, 2020 to Extended European Search Report dated Sep. 5, 2019", 22 pgs.

"U.S. Appl. No. 16/115,259, Non Final Office Action dated Apr. 9, 2020", 18 pgs.

"Korean Application Serial No. 10-2018-7031055, Response filed Mar. 27, 2020 to Office Action dated Feb. 25, 2020", w English claims, 24 pgs.

"U.S. Appl. No. 15/628,408, Final Office Action dated Apr. 13, 2020", 45 pgs.

"U.S. Appl. No. 16/126,869, Response filed May 5, 2020 to Non Final Office Action dated Feb. 5, 2020", 8 pgs.

"Korean Application Serial No. 10-2019-7018501, Notice of Preliminary Rejection dated Apr. 16, 2020", w English Translation, 20 pgs.

"U.S. Appl. No. 16/433,725, Response filed May 8, 2020 to Non Final Office Action dated Feb. 27, 2020", 13 pgs.

"U.S. Appl. No. 16/365,300, Final Office Action dated May 13, 2020", 44 pgs.

"European Application Serial No. 17876226.6, Communication Pursuant to Article 94(3) EPC dated May 29, 2020", 5 pgs.

"U.S. Appl. No. 16/433,725, Final Office Action dated Jun. 2, 2020", 29 pgs.

Gundersen, Eric, "Foursquare Switches to MapBox Streets, Joins the OpenStreetMap Movement", [Online] Retrieved from the Internet: URL: https: blog.mapbox.com foursquare-switches-to-mapbox-streets-joins-the-openstreetmap-movement-29e6a17f4464, (Mar. 6, 2012), 4 pgs.

Perez, Sarah, "Life 360, The Family Locator With More Users Than Foursquare, Raises a $10 Million Series B", [Online] Retrieved from the Internet: URL: https: techcrunch.com 2013 07 10 life360-the-family-locator-with-more-users-than-foursquare-raises-10-million-series-b , (Jul. 10, 2013), 2 pgs.

"U.S. Appl. No. 15/401,926, Response filed Jul. 30, 2020 to Non Final Office Action dated Mar. 30, 2020", 10 pgs.

"U.S. Appl. No. 15/628,408, Response filed Jul. 13, 2020 to Final Office Action dated Apr. 13, 2020", 20 pgs.

"U.S. Appl. No. 16/115,259, Final Office Action dated Jul. 22, 2020", 20 pgs.

"U.S. Appl. No. 16/115,259, Response filed Jul. 9, 2020 to Non Final Office Action dated Apr. 9, 2020".

(56) References Cited

OTHER PUBLICATIONS

"U.S. Appl. No. 16/126,869, Final Office Action dated Jul. 7, 2020", 8 pgs.
"U.S. Appl. No. 16/193,938, Final Office Action dated Aug. 28, 2020", 10 pgs.
"U.S. Appl. No. 16/365,300, Response filed Aug. 13, 2020 to Final Office Action dated May 13, 2020".
"U.S. Appl. No. 16/409,390, Final Office Action dated Jun. 15, 2020", 12 pgs.
"U.S. Appl. No. 16/409,390, Response filed Aug. 5, 2020 to Final Office Action dated Jun. 15, 2020", 11 pgs .
"U.S. Appl. No. 16/433,725, Examiner Interview Summary dated Jul. 20, 2020", 4 pgs.
"U.S. Appl. No. 16/433,725, Non Final Office Action dated Aug. 20, 2020", 29 pgs.
"U.S. Appl. No. 16/433,725, Response filed Aug. 3, 2020 to Final Office Action dated Jun. 2, 2020", 12 pgs.
"U.S. Appl. No. 16/552,003, Notice of Allowance dated Aug. 27, 2020", 15 pgs.
"European Application Serial No. 18791925.3, Response Filed Jul. 27, 2020 to Extended European Search Report dated Jan. 2, 2020", 19 pgs.
"Korean Application Serial No. 10-2019-7002736, Notice of Preliminary Rejection dated May 25, 2020", W/English Translation, 16 pgs.
"Korean Application Serial No. 10-2019-7002736, Response filed Jul. 9, 2020 to Notice of Preliminary Rejection dated May 25, 2020", w/ English Claims, 29 pgs.
"Korean Application Serial No. 10-2019-7014555, Notice of Preliminary Rejection dated Jul. 20, 2020", w/ English Translation, 12 pgs.
"Korean Application Serial No. 10-2019-7018501, Response filed Jun. 16, 2020 to Notice of Preliminary Rejection dated Apr. 16, 2020", w/ English Claims, 17 pgs.
"Korean Application Serial No. 10-2020-7022773, Notice of Preliminary Rejection dated Aug. 23, 2020", w/ English translation, 11 pgs.
"U.S. Appl. No. 16/409,390, Non Final Office Action dated Sep. 11, 2020", 15 pgs.
"Korean Application Serial No. 10-2019-7018501, Final Office Action dated Sep. 8, 2020", w/ English translation, 9 pgs.
"U.S. Appl. No. 16/365,300, Non Final Office Action dated Sep. 28, 2020", 40 pgs.
"U.S. Appl. No. 16/563,445, Non Final Office Action dated Sep. 29, 2020", 11 pgs.
"U.S. Appl. No. 15/628,408, Notice of Allowance dated Sep. 29, 2020", 13 pgs.
"U.S. Appl. No. 16/126,869, Response filed Oct. 7, 2020 to Final Office Action dated Jul. 7, 2020", 10 pgs.
"European Application Serial No. 17876226.6, Response filed Oct. 2, 2020 to Communication Pursuant to Article 94(3) EPC dated May 29, 2020", 22 pgs.
"U.S. Appl. No. 16/115,259, Response filed Oct. 22, 2020 to Final Office Action dated Jul. 22, 2020", 10 pgs.
"U.S. Appl. No. 15/199,472, Notice of Allowance dated May 13, 2019", 3 pgs.
U.S. Appl. No. 16/552,003, filed Aug. 27, 2019, Generating and Displaying Customized Avatars in Electronic Messages.
U.S. Appl. No. 16/563,445, filed Sep. 6, 2019, Customized Digital Avatar Accessories.
"U.S. Appl. No. 15/199,472, Notice of Allowability dated May 13, 2019", 3 pgs.
"U.S. Appl. No. 15/199,472, Notice of Allowance dated Mar. 18, 2019", 23 pgs.
"U.S. Appl. No. 15/365,046, Notice of Allowance dated May 21, 2019", 14 pgs.

"U.S. Appl. No. 15/365,046, Response filed Mar. 20, 2019 to Non Final Office Action dated Dec. 20, 2018", 20 pgs.
"U.S. Appl. No. 15/401,926, Response filed May 20, 2019 to Restriction Requirement dated Mar. 29, 2019", 9 pgs.
"U.S. Appl. No. 15/401,926, Restriction Requirement dated Mar. 29, 2019", 7 pgs.
"U.S. Appl. No. 15/583,142, Final Office Action dated Mar. 22, 2019", 11 pgs.
"U.S. Appl. No. 15/583,142, Notice of Allowance dated Jun. 6, 2019", 8 pgs.
"U.S. Appl. No. 15/583,142, Response filed May 9, 2019 to Final Office Action dated Mar. 22, 2019", 8 pgs.
"U.S. Appl. No. 15/628,408, Final Office Action dated Jun. 10, 2019", 44 pgs.
"U.S. Appl. No. 15/628,408, Response filed Apr. 2, 2019 to Non Final Office Action dated Jan. 2, 2019", 15 pgs.
"U.S. Appl. No. 15/628,408, Supplemental Amendment filed Apr. 4, 2019 to Non Final Office Action dated Jan. 2, 2019", 12 pgs.
"European Application Serial No. 17751497.3, Response filed May 20, 2019 to Communication pursuant to Rules 161(1) and 162 EPC dated Feb. 14, 2019", w/ English Claims, 24 pgs.
"International Application Serial No. PCT/US2017/057918, International Preliminary Report on Patentability dated May 9, 2019", 9 pgs.
Neis, Pascal, "The OpenStreetMap Contributors Map aka Who's around me?", [Online] Retrieved from the internet by the examiner on Jun. 5, 2019: <URL: https://neis-one.org/2013/01/oooc/>, (Jan. 6, 2013), 7 pgs.
Sulleyman, Aatif, "Google Maps Could Let Strangers Track Your Real-Time Location for Days At a Time", The Independent, [Online] Retrieved from the internet by the examiner on Jun. 5, 2019: <URL: https://www.independent.co.uk/life-style/gadgets-and-tech/news/google-maps-track-location-real-time-days-privacy-security-stalk-gps-days-a7645721.html>, (Mar. 23, 2017), 5 pgs,.
"Korean Application Serial No. 10-2019-7002736, Final Office Action dated Nov. 26, 2020", w/ English Translation, 8 pgs.
U.S. Appl. No. 16/409,390, filed May 10, 2019, Automated Avatar Generation.
U.S. Appl. No. 16/433,725, filed Jun. 6, 2019, Avatar Based Ideogram Generation.
U.S. Appl. No. 16/365,300, filed Mar. 26, 2019, Location-Based Virtual Avatars.
"U.S. Appl. No. 15/401,926, Non Final Office Action dated Oct. 27, 2020", 10 pgs.
"U.S. Appl. No. 16/126,869, Non Final Office Action dated Oct. 30, 2020", 9 pgs.
"U.S. Appl. No. 16/193,938, Response filed Nov. 30, 2020 to Final Office Action dated Aug. 28, 2020", 9 pgs.
"U.S. Appl. No. 16/409,390, Final Office Action dated Dec. 23, 2020", 15 pgs.
"U.S. Appl. No. 16/409,390, Response filed Dec. 8, 2020 to Non Final Office Action dated Sep. 11, 2020", 12 pgs.
"U.S. Appl. No. 16/433,725, Response filed Nov. 16, 2020 to Non Final Office Action dated Aug. 20, 2020", 12 pgs.
"Korean Application Serial No. 10-2019-7014555, Response filed Oct. 6, 2020 to Notice of Preliminary Rejection dated Jul. 20, 2020", w/ English Claims, 27 pgs.
"Korean Application Serial No. 10-2020-7022773, Response filed Oct. 19, 2020 to Notice of Preliminary Rejection dated Aug. 23, 2020", w/ English Claims, 26 pgs.
U.S. Appl. No. 17/247,169, filed Dec. 2, 2020, Generating and Displaying Customized Avatars in Electronic Messages.
"U.S. Appl. No. 16/115,256, Non Final Office Action dated Jan. 11, 2021", 17 pgs.
"Koren Application Serial No. 10-2019-7018501, Response filed Dec. 7, 2020 to Final Office Action dated Sep. 8, 2020", w/ English Claims, 26 pgs.

\* cited by examiner

US 10,938,758 B2

GENERATING AND DISPLAYING CUSTOMIZED AVATARS IN MEDIA OVERLAYS

CROSS-REFERENCE TO RELATED APPLICATIONS

This application claims priority to U.S. Provisional Patent Application Ser. No. 62/412,115, filed Oct. 24, 2016 and entitled "GENERATING AND DISPLAYING CUSTOMIZED AVATARS IN MEDIA OVERLAYS." the disclosure of which is incorporated by reference.

BACKGROUND

The popularity of electronic messaging, particularly instant messaging, continues to grow. Users increasingly use "emoji" (which are ideograms and icons) within electronic messages such as texts and emails. Users also increasingly share media content items such as electronic images and videos with each other, reflecting a global demand to communicate more visually. However, conventional emoji and similar graphics that may be used in conjunction with electronic messages, images, and video are typically generic and lacking in diversity: every individual user is represented by the same set of faces, irrespective of appearance, gender or ethnicity. Furthermore, every conversation that uses conventional emoji looks identical, and there is no visual personality or cue to identify the participants or distinguish one interaction from the next. Embodiments of the present disclosure address these and other issues.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Among other things, embodiments of the present disclosure improve the functionality of electronic messaging and imaging software and systems by generating and displaying media overlays with avatars of different users. For example, media overlays can be generated by the system and displayed in conjunction with media content (e.g., images and/or video) generated by an image-capturing device (e.g., a digital camera).

In some embodiments, media overlays may also be generated that contain avatars of users who exchange electronic communications, such as SMS or MMS texts and emails. Such overlays may be automatically generated based on the history of communications between users, the users' locations, and events the users are engaged in. The appearance of users' avatars in such overlays may likewise be modified based on location and event information. In some embodiments, media overlays may be presented to a user in a gallery or carousel that include customized avatars of the user and the user's friends/contacts.

Figure 1:
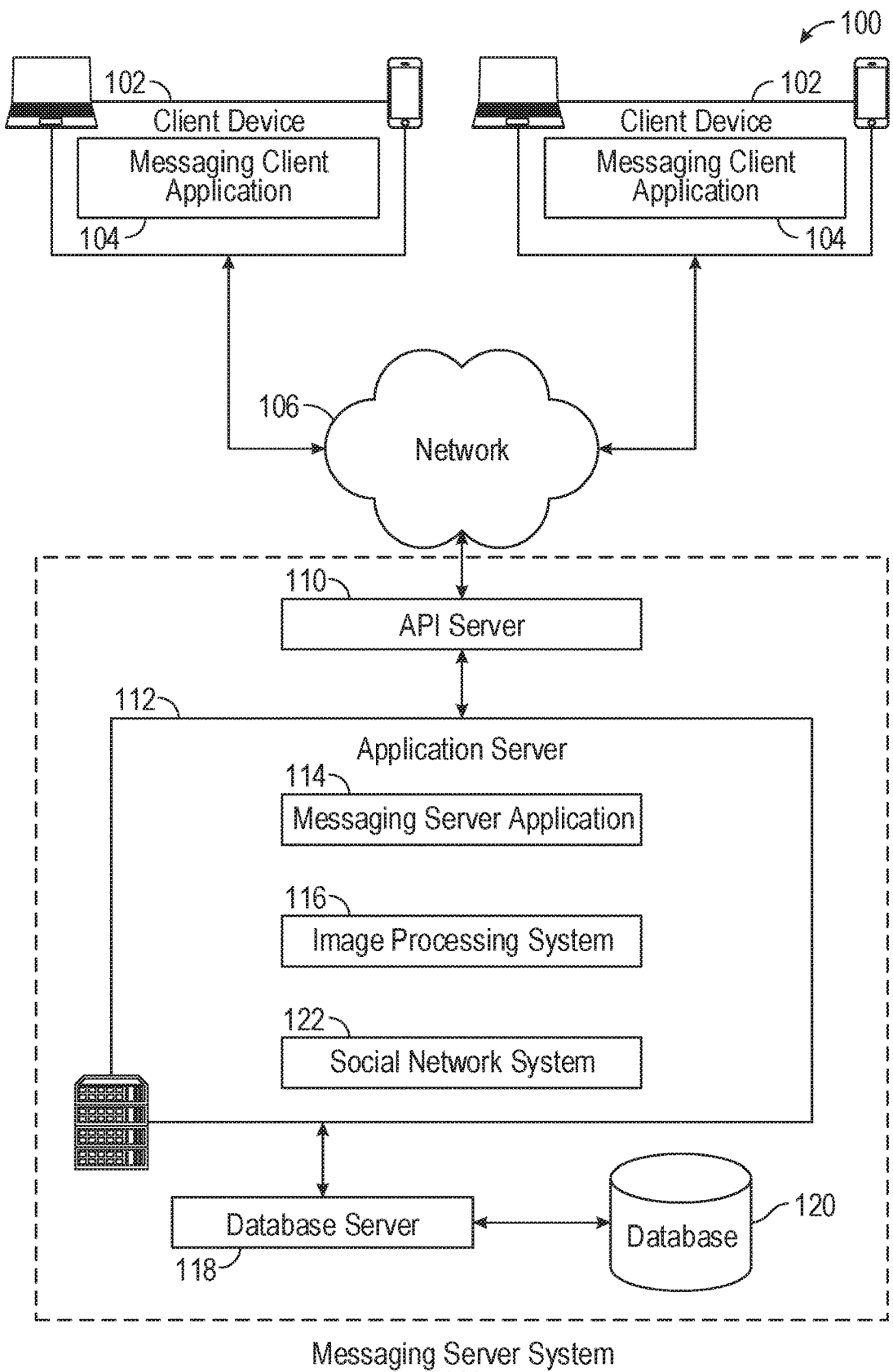
FIG. 1 is a block diagram showing an example messaging system for exchanging data (e.g., messages and associated content) over a network.

FIG. 1 is a block diagram showing an example of a messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). As used herein, the term "client device" may refer to any machine that interfaces to a communications network (such as network 106) to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

In the example shown in FIG. 1, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The network 106 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of electronic media files (e.g., electronic images and/or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content including images and video clips) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to electronic images and/or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Some embodiments may include one or more wearable devices, such as a pendant with an integrated camera that is integrated with, in communication with, or coupled to, a client device 102. Any desired wearable device may be used in conjunction with the embodiments of the present disclosure, such as a watch, eyeglasses, goggles, a headset, a wristband, earbuds, clothing (such as a hat or jacket with integrated electronics), a clip-on electronic device, and/or any other wearable devices.

Figure 2:
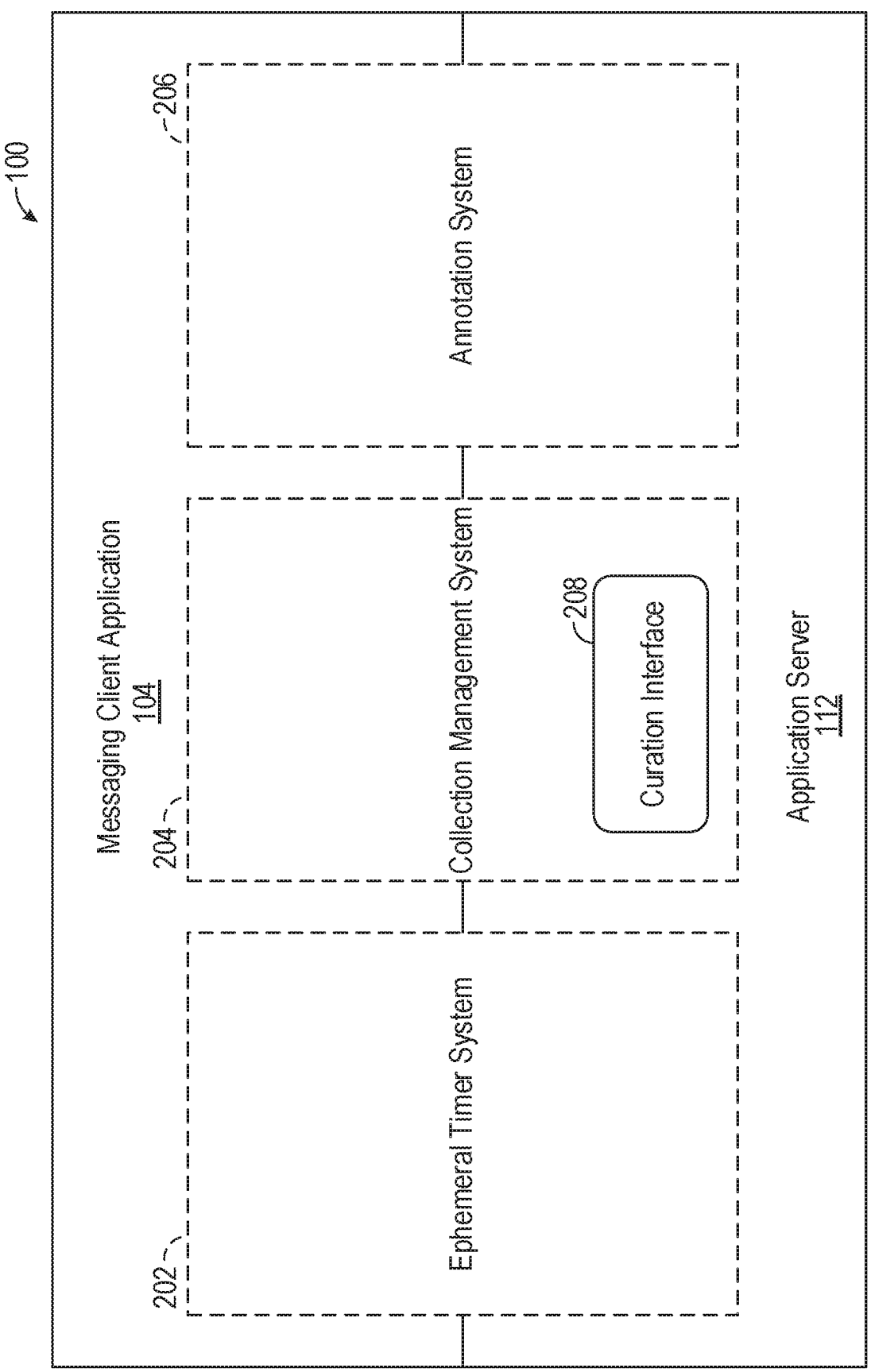
FIG. 2 is block diagram illustrating further details regarding a messaging system, according to exemplary embodiments.

FIG. 2 is block diagram illustrating further details regarding the messaging system 100, according to exemplary embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content via the messaging client application 104.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., an image or video) at the client device 102. For example, the media overlay including text that can be overlaid on top of a photograph/electronic image generated by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some exemplary embodiments, as discussed in more detail below, embodiments of the present disclosure may generate, display, and apply media overlays to media content items where the media overlays include customized avatars of one or more users. For example, the avatar may represent the user of a computing device performing functionality of the embodiments of the present disclosure. Additionally or alternatively, the media overlay can include an avatar representing one or more other users, such as friends of the user in the user's contact list, as well as one or more users with whom the user of a computing device exchanges electronic communications such as text messages, emails, and media content.

In one exemplary embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
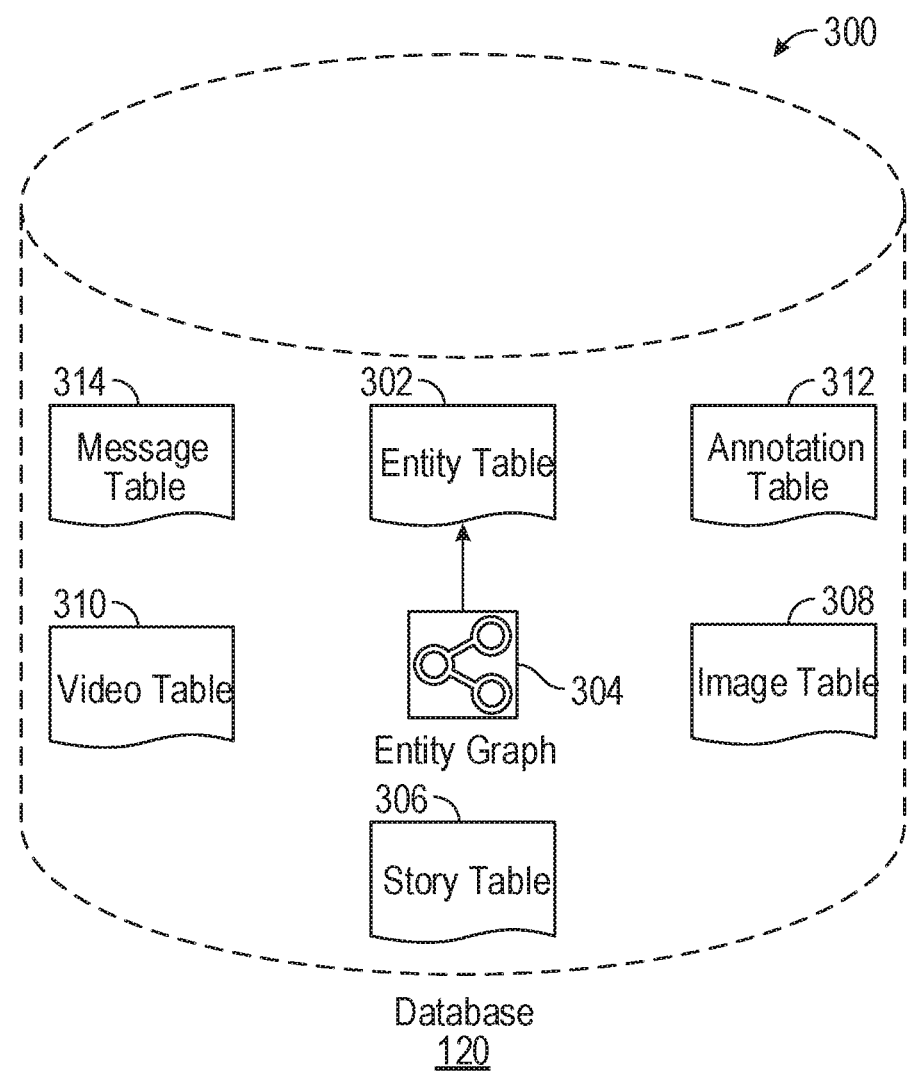
FIG. 3 is a schematic diagram illustrating data which may be stored in the database of the messaging server system, according to various exemplary embodiments.

In another exemplary embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a schematic diagram 300 illustrating data 300 that is stored in the database 120 of the messaging server system 108, according to certain exemplary embodiments. While the content of the database 120 is shown to comprise a number of tables, the data could be stored in other types of data structures (e.g., as an object-oriented database).

The database 120 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filters include geolocation filters (also known as Geofilters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "Lens" data. A "Lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a SNAPCHAT story or a gallery). The creation of a particular collection may be initiated by a particular user (e.g., each user for which a record is maintained in the entity table 302). A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Embodiments of the present disclosure may generate and present customized images for use within electronic messages/communications such as short message service (SMS) or multimedia message service (MMS) texts and emails. The customized images may also be utilized in conjunction with the SNAPCHAT stories, SNAPCHAT filters, and ephemeral messaging functionality discussed herein.

Figure 4A:
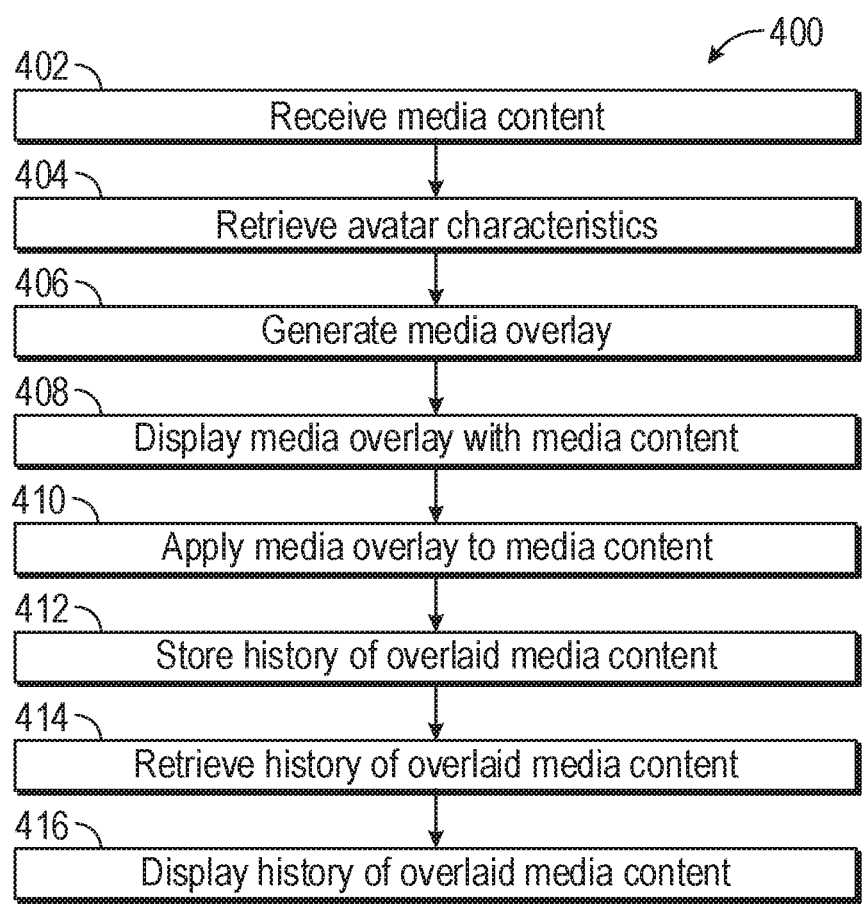
FIGS. 4A and 4B are flow diagrams of exemplary processes according to various aspects of the disclosure.

FIG. 4A depicts an exemplary process according to various aspects of the present disclosure. In this example, method 400 includes receiving a media content item (402), retrieving avatar characteristics for a user (404), generating a media overlay (406), displaying the media overlay with the media content item (408), and applying the media overlay to the media content item (410). Method 400 further includes storing a history of overlaid media content items (412), retrieving the history of media content items (414), and displaying the history of overlaid media content items (416).

Figure 4B:
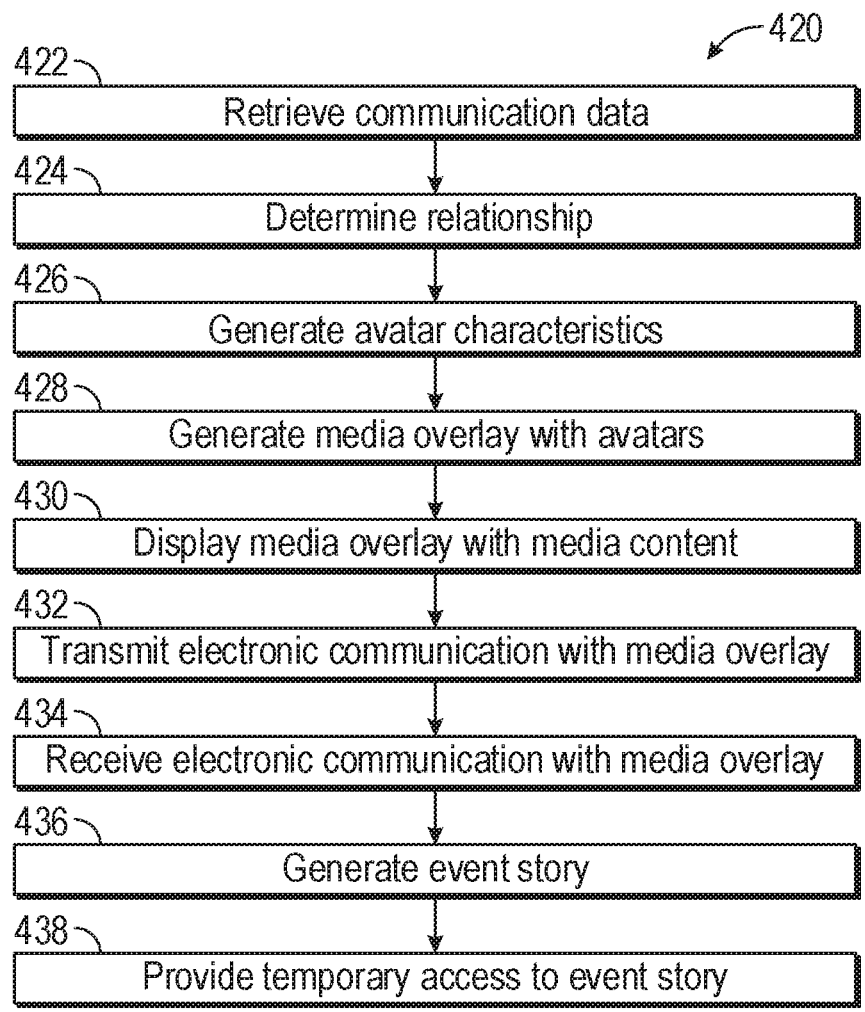

FIG. 4B depicts another exemplary process 420 that includes retrieving communication data regarding communications between one or more users (420), determining a relationship between the users based on the communication data (424), generating avatar characteristics based on the relationship (426), generating a media overlay containing avatars representing the users based on the avatar characteristics (428), displaying the media overlay with a media content item on a display (430), and transmitting an electronic communication containing the media overlay (432). Method 420 further includes receiving an electronic communication containing a media overlay (434), generating an event story based on communications between users (436), and providing temporary access to the event story (438). The steps of method 400 and 420 may be performed in whole or in part, may be performed in conjunction each other as well as with some or all of the steps in other methods, and may be performed by any number of different systems, such as the systems described in FIGS. 1 and/or 7.

A variety of media content items may be received (402) from a variety of sources. In this context, a "media content item" may include any type of electronic media in any format. For example, a media content item may include an image in JPG format, an image in PNG format, a video in FLV format, a video in AVI format, etc. In some exemplary embodiments, a media content item is captured using an image capture device or component (such as a digital camera) coupled to, or in communication with, a system performing the functionality of method 400. In the exemplary system 700 depicted in FIG. 7 may include a digital camera as one of input components 728. Additionally or alternatively, the media content item may be received from another system or device. In FIG. 1, for example, a client device 102 performing the functionality of method 400 may receive a media content item from another client device 102 or other system via network 106.

In method 400, the system retrieves avatar characteristics (404) for a user. In some cases, the user for whom avatar characteristics are retrieved may be a user of the system performing the steps of method 400 (such as client device 102 in FIG. 1). Additionally or alternatively, the system may retrieve avatar characteristics for a user of another device, a user listed in the contact list of the user of the system, a user of a social network identified by the user of the system, or any other individual. In one exemplary embodiment, the system (e.g., client device 102 in FIG. 1) transmits a request to a server (e.g., application server 112) for a media overlay that includes the avatar characteristics for the user. The server may then transmit the media overlay that includes the avatar of the user to the system. In this manner, the system may distribute the creation/generation of some or all of the media overlay with other connected systems and devices.

As used herein, an "avatar" of a user is any visual representation of user. The avatar of a user may be based on characteristics derived from images of the user in conjunction with the avatar characteristics identified from the user's relationships with other users. Alternatively or additionally, the user may select and customize characteristics of the user's avatar via the user's computing device. Such avatar characteristics may include, for example, the user's bodily features (e.g., muscular, thin, etc.), facial features, clothing and accessories, text displayed in conjunction with the avatar, and images displayed in conjunction with the avatar. As discussed in more detail below (with reference to method 420), the system may also generate (426) avatar characteristics for one or more users based on various factors. The avatar characteristics may be retrieved (404) from a variety of sources, such as the local memory of a device performing the steps of method 400 (e.g., client device 102 in FIG. 1) as well as from other systems and devices, such as a database or server.

The system generates a media overlay (406) based on the retrieved avatar characteristics to generate an overlay that includes the avatar of one or more users and displays (408) the media overlay in conjunction with a media content item. The overlay may include static (i.e., non-moving) avatars as well as dynamic (i.e., moving) avatars. In some embodiments, application of the overlay (410) may change the format of the image. For example, where the media content item is in a static image format such a JPG, and where the media overlay includes a dynamic component, such as an animated GIF, the system may convert the media content item to an animated GIF to apply the media overlay to the media content item.

The system may also generate and modify other features of the media overlay as part of generating the overlay, such as starting with a template media overlay and modifying the setting, colors, text, avatars, and other features displayed within the media overlay. Among other things, this allows embodiments of the present disclosure to use some standard template features in a media overlay (and thus do not need to recreate each media overlay from scratch) while also allowing the system to customize media overlays to provide a unique graphical experience to each user.

In some embodiments, the system may provide a user with access to a media overlay for a predetermined time period. In some embodiments, media overlays may be received from another system or device (e.g., by client device 102 from application server 112 in FIG. 1) and made available for a limited time. Among other things, this helps provide users with new material and encourages them to check the gallery/carousel of media overlays for new content.

In some embodiments, the gallery/carousel of media overlays may include one or more dedicated slots for avatar-based media overlays. Some filters/media overlays might appear in a particular week for as little as 1 minute, giving users who had the luck to find the media overlay a special opportunity to use the media overlay as well as a reason to "tune into" the gallery/carousel throughout the day to see what's new. Among other things, the customized media overlays/filters of the present disclosure help introduce personalization to the media overlays for different users, an opportunity for surprise and serendipity in applying the media overlay to a media content item, the ability to add character to a media content item beyond its original content, and encourage users to check out the gallery/carousel of media overlays to view new content.

Accordingly, display of the media overlay (408) may include presenting a plurality of media overlays on the display screen of a computing device and receiving a selection of one or more media overlays from the plurality of media overlays to display in conjunction with the media content item. The user may then add, remove, and/or modify the displayed media overlays before applying the media overlay(s) to the content item.

In some embodiments, a first media overlay may be redundant or otherwise incompatible with a second media overlay in a selection of media overlays in a gallery/carousel. In such embodiments, the system may receive (e.g., via an input device of a user interface) selection of a first overlay by a user and, in response to the selection of the first media overlay, remove (or disable selection of by, for example, graying out the selection) a second media overlay from the plurality of media overlays presented to the user.

Figure 5A:
FIGS. 5A-5F are screenshots illustrating the steps of the methods described in FIGS. 4A and 4B.
Figure 5B:
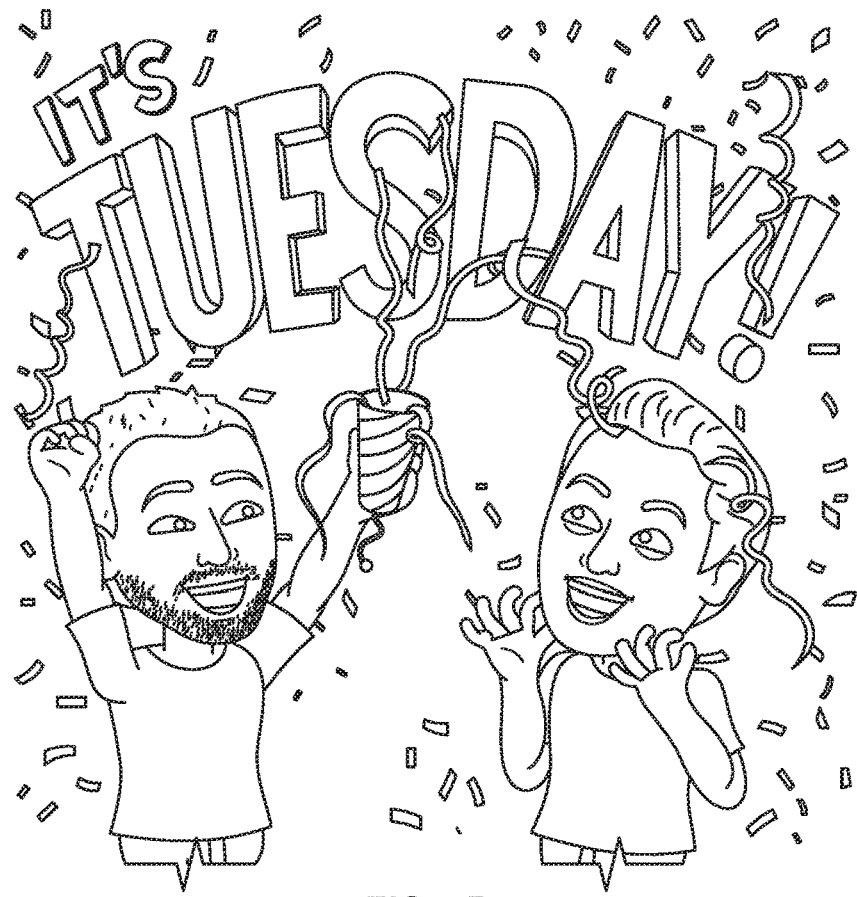

The system may generate the media overlay based on information in addition to, or other than, the avatar characteristics. For example, the media overlay may be generated based on location information for the system (e.g., received from a location sensor coupled to the device performing the steps of method 400), the time of day, the date, an event (such as a holiday or a birthday of the user), and other information. Time and date information can be determined based on time and time zone information from a clock coupled to the system. In FIG. 5E for example, the upper-left media overlay may be displayed in the morning relative to the system on which it is displayed, while the media overlay in the lower right can be displayed in the evening based on the system's time. Likewise, the "Happy Friday" or similar media overlay in FIG. 5F can be generated based on the day of the week as determined from the system's clock.

Figure 7:
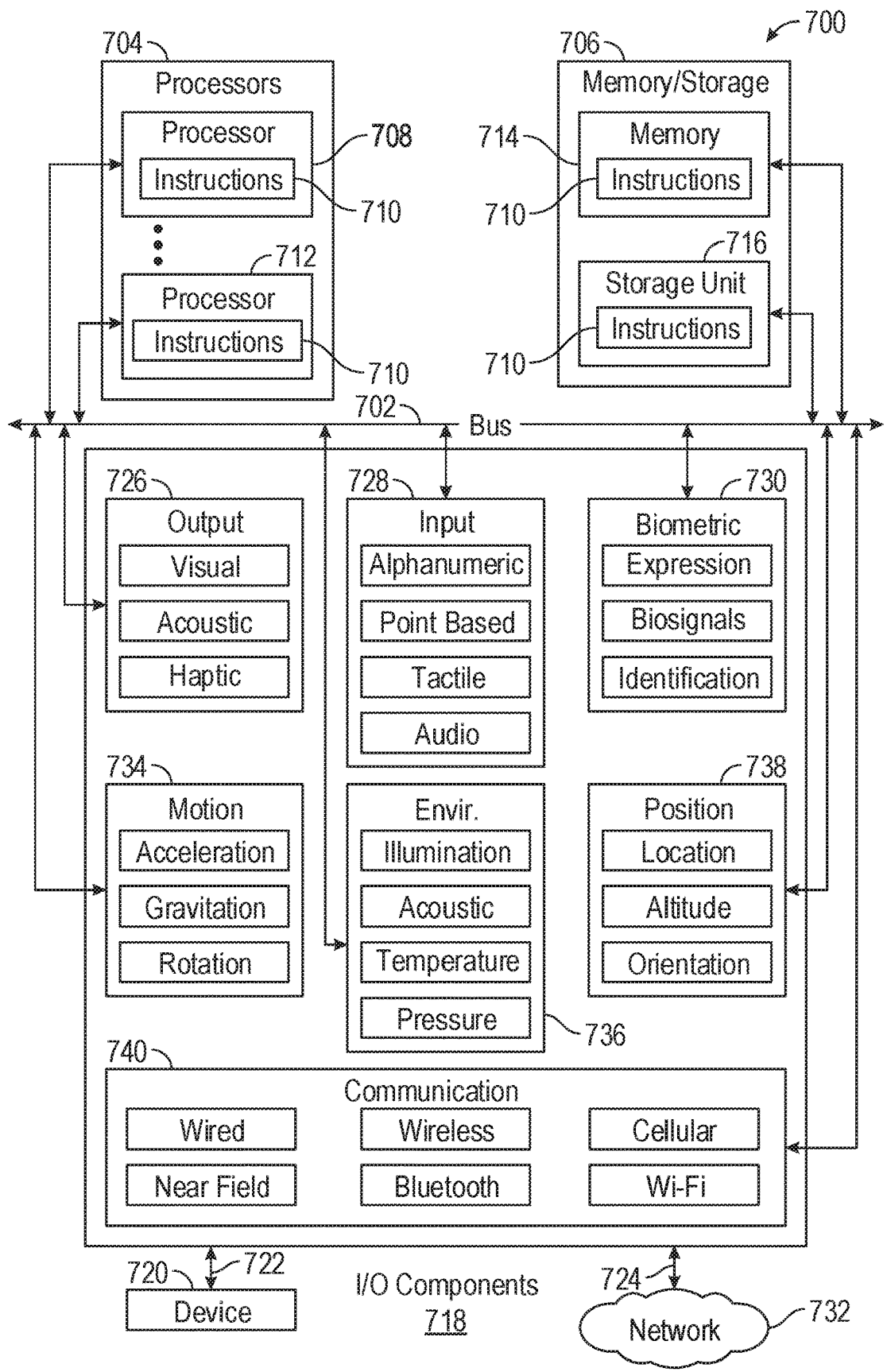
FIG. 7 is a block diagram illustrating components of a machine, according to some exemplary embodiments, able to read instructions from a machine-readable medium (e.g., a machine-readable storage medium) and perform any one or more of the methodologies discussed herein.

Embodiments of the present disclosure can also generate a media overlay based on information retrieved/received from one or more sensors coupled to, or in communication with, the system, such as any of the sensor components 730, 734, 736, 738 in system 700 depicted in FIG. 7. Accordingly, the media overlay may thus be generated based on data from a temperature sensor, velocity sensor, acceleration sensor, altitude sensor, and/or any other sensor information.

Embodiments of the present disclosure may generate any desired content in conjunction with generating (406) the media overlay, including images, video, text, visual effects, etc. In some embodiments, the generation of text and other content may be generated based on identifying a location for the system (e.g., based on location information from a location sensor coupled to the system), identifying a language associated with the system's location, and generating text for the media overlay in the identified language.

In some embodiments the actual time for the system can be displayed as part of the media overlay, such as is shown on the clock around the neck of the avatar in the lower-left media overlay in FIG. 5E. Media overlays can also be generated based on information stored in the user's calendar on the system, such as birthday information (e.g., a "happy birthday" overlay) as well as scheduling information that could be used to determine when the user leaves work, as shown in the upper-right media overlay in FIG. 5E. Location information for the system in conjunction with date and time information may be used to generate media overlays based on holidays in the location where the system is present, such as the "Happy Halloween" media overlay in FIG. 5F The media overlay can be displayed (408) in conjunction with the media content item on the display screen of a computing device to allow a user to determine if he/she wishes to apply the overlay to the content item, to select from among a plurality of media overlays, as well as to allow the user to modify parameters of the media overlay. For example, a user may be presented the media overlays depicted in FIGS. 5E and 5F in a carousel or gallery to allow the user to see how the overlay will affect the media content item. The user may also be given an interface to modify the color and/or size of features of the media overlay, as well as to edit text in the overlay. In the four media overlays in FIG. 5E, for example, the user may be given an interface to change the text and/or the font/colors of the text prior to application of the overlay to the media content item. In some embodiments, editing of a media overlay or media content item can be performed by a user after the media overlay is applied to the media content item. The user may provide selections (e.g., via the input device of a user interface on the user's computing device) to edit and/or apply (410) the media overlay to the media content item.

As described above, a collection of content, including media content items with applied media overlays may be organized into an "event gallery" or an "event story" and such collections may be made available for a predetermined time period, such as the duration of an event to which the content relates. The system may store (412) a history of media content items with applied media overlays in the memory of the system, a database in communication with the system, and/or another system or device in communication with the system performing the functionality of method 400. The system may retrieve (414) and display (416) some or all of the media content items in such a history as well.

A history of media content items may be stored in any desired format and in any desired manner. In one exemplary embodiment, the media content items store an identifier for the media overlay and an identifier for the user's avatar, rather than a copy of the rendered media content item with the media overlay applied. Upon retrieval (414) the system looks up the media overlay and avatar information and generates the combined media content item/media overlay combination on demand. Among other things, this helps save memory on the user's device as well as on servers and databases that may store the information.

In some embodiments, the avatar of a user may include a version number. If the user or system modifies the user's avatar after a media content item/media overlay combination is saved to a history, the system may use the previous (i.e., originally saved) version of the user's avatar in any rendered media content based on the stored content. In other embodiments, the system may render the filter/media overlay using the current version of the user's avatar.

In the exemplary method 420 shown in FIG. 4B, Embodiments of the present disclosure can retrieve (422) a variety of communication data from a variety of sources. For example, communication data may be retrieved from the memory of a computing device (such as client computing device 102 in FIG. 1) performing some or all of the functionality of method 420. Alternately or additionally, communication data may be retrieved from another computing device (e.g., over a network). Communication data may include a history of electronic communications (such as emails, text messages, and the like) between a plurality of users. For example, consider two users, a first user and a second user, who exchange a series of text messages with each other using their respective mobile computing devices (e.g., client computing devices 102 in FIG. 1). The computing device of the first user may be adapted to store the messages in its memory for later retrieval, or to request the messages (or information regarding them) from another source (such as application server 112 in FIG. 1).

The communication data may include meta data associated with one or more communications, such as the size of the communication, the date/time it was sent, one or more languages used in the communication, identifiers for the sender and/or recipient(s), information regarding the computing devices (e.g. the mobile devices of the sender or recipient or a messaging server) involved in transmitting or receiving the communication, and other information. In the case of identification information, any such identifier may be used, such as the user's full name or a username associated with the user. The user identifier may also be an identifier associated with the user's computing device, such as a Unique Device Identifier (UDID) or Identifier for Advertising (IDFA). The communication data may also include text, images, video, and other content within a communication. For example, the communication data may include terms used by users within one or more communications to address each other, such as "hi mom," "hey buddy." "how's my favorite nephew." and the like. Such terms (and other communication data) may be used to help identify a relationship between users based on their communications with each other as discussed below.

The system may request authorization from a user to analyze communication data associated with the user's communications. The authorization request may be presented to the user via the user's computing device and may allow the user to select the types of communication data the system may analyze as well as allowing the user to entirely disable the system from analyzing the user's communication data altogether. In cases where the user grants the system access to analyze the user's communication data, the system can analyze the communication data to automatically determine (424) a relationship between the user and other users with whom the user communicates.

Embodiments of the present disclosure can identify any number of different relationships between any number of users. Examples of such relationships may include family relationships, friendships, or romantic relationships, as well as others. Embodiments of the disclosure may also identify other aspects of relationships between users, such as whether the users are work colleagues, classmates, roommates, and/or acquaintances. Analysis of communication data to identify relationships between users may also be supplemented with other information, such as data retrieved from social networking sites, as well as direct input from the user providing information on his/her relationships with various users.

Based on the relationship between different users, the system can generate characteristics for avatars (426) that represent the different users and use such avatar characteristics to generate media overlays (428) containing the avatars of the users.

Embodiments of the present disclosure may generate (428) images within media overlays containing any number of avatars. For example, an image containing a single avatar may be generated in some cases, while an image containing multiple user avatars may be generated in other cases. FIGS. 5A-5E illustrate exemplary images that include a first avatar representing a first user and a second avatar representing a second user according to various aspects of the disclosure. Such images may be displayed (430) within a media overlay on the display screen of one or more computing devices. Media overlays generated by embodiments of the present disclosure may include any number of user avatars in a variety of forms. For example, FIG. 5A depicts an avatar of a first user with the avatar of a second user on his shirt.

In some embodiments, besides using images containing avatars within media overlays, such images may be used in conjunction with displaying the avatars within a video game. In some cases, the images may be displayed in a single-person game (e.g., played alone by a first user on the first user's computing device) or in a multi-player game (e.g., the game is accessed by the computing device of a first user and the computing device of a second user) played over a network or other connection. During the game, various events may occur and the avatars of one or more users may be modified as a result. For example, an avatar who experiences an injury may be depicted with a black eye, while an avatar who finds an item in the game (e.g., a sword) can be modified to show the avatar carrying the item. In this manner, embodiments of the disclosure allow users to have their own customized avatars (which may be based on their own likenesses) appear in video games as well as in other contexts, such as text messages or other electronic communications.

Generation of the images containing user avatars may be based on an event. The event may affect one user (such as the user's birthday) or be common to multiple users. For example, referring to FIG. 5B, an image depicting avatars of two users is generated based on a day of the week.

Generation of the images containing user avatars may be based on the locations of different users. For example, embodiments of the present disclosure may retrieve location information from the computing devices of two different users. In embodiments where a client computing device (such as client device 102) is performing the image/media overlay generation, location information for the device can be retrieved from the device's global positioning system and location information for the device of another can be requested over a network.

The avatars of different users in different locations can be generated to reflect their respective locations. For example, the avatar of a first user whose mobile computing device indicates is in the tropics could be depicted standing in a bathing suit on a beach, while the avatar of a second user whose mobile device indicates is in an area with snow could be depicted wearing a jacket and shivering. Accordingly, the location information from a device associated with a user can be combined with information regarding the location and/or an event occurring at the location to generate the avatar and/or image. Such location-based information may include weather information, time of day, local customs (such as language and/or dress), and other information.

In some cases, the system can identify that two or more users are in a common location. In this context, a "common location" may be identified as being within any predetermined boundary, such as within the same building, the same city, the same two-block radius, the same state, etc. In such cases, the image in the media overlay can be generated to depict the avatars of multiple users based on the common location. As described above, the image containing multiple avatars may be generated based on information regarding the location as well as identifying an event taking place at the common location. Such events may include, for example, a sporting event, a business meeting, an educational event, a pre-arranged meeting between the user and another person (such as a lunch meeting), and other events.

Figure 5C:
Figure 5D:
Figure 5E:
Figure 5F:
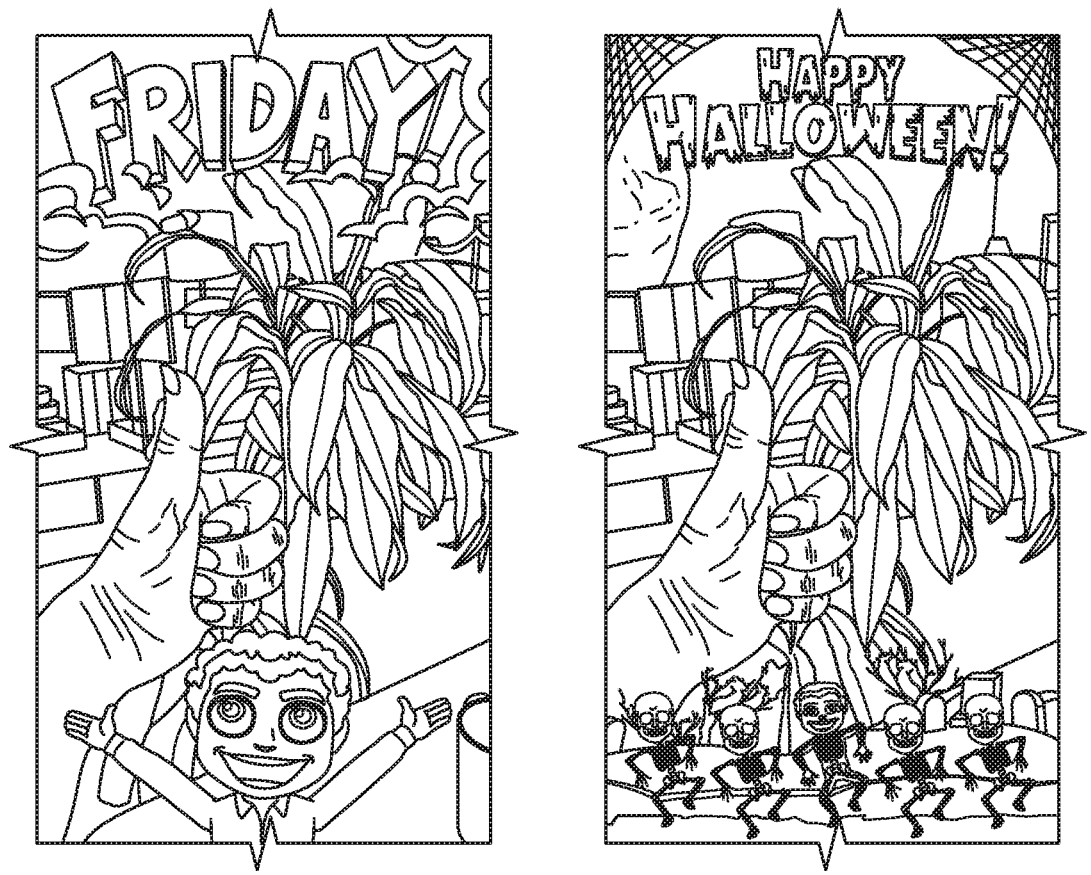

In one exemplary embodiment, referring to FIG. 5C, the system identifies that a first user and second user are both participating in a race, and that the first user finished the race ahead of the second user. The system then automatically generates a media overlay containing the image in FIG. 5C and presents the media overlay to the first user and/or second user via their mobile computing devices for application with a media content item, such as an image or video of the two users racing. In this example, the details of the event (i.e., race in this case) can be identified by the system based on information from a combination of different sources, such as location information from each user's mobile computing device, information about the race occurring collected from a website hosted by the race's sponsor based on a web search using the identified location, posts by the first and second user to a social media website, and a history of electronic communications between the first and second user where the second user congratulates the first user on winning and the first user consoling the second user. In this manner, the system can utilize a combination of publically-available information and information the system is authorized by the user to access (such as the content of the user's communications) to automatically generate images and media overlays including the user's avatar and/or the avatars of other users.

In some embodiments, the system may modify various features of an avatar, as well as features of an image containing an avatar, based on location information and/or event information. In FIG. 5B, for example, a similar image could be generated for other days of the week where the setting or background of the image displaying the name of the day of the week (e.g., Wednesday vs. Tuesday) can be modified. Likewise, either avatar can be modified based on various information. For example, referring now to FIG. 5D, the system may identify an event taking place at a common location (a cupcake festival in this example) and generate an image of the first user standing next to the second user, where the second user's body is depicted as a cupcake. As above, the image can be generated based on content of communications between the users, such as based on a comment by the second user in a text message to the first user that "I ate so many cupcakes. I feel like one."

The system can modify avatars and images based on identified events and locations in any suitable manner. For example, avatars of users attending the same sporting event could be depicted in an image wearing the jersey of one of the teams playing at the event. Users attending a paintball event together could result in an image being generated showing avatars of the users holding paintguns and covered in paint. Users attending a mud obstacle race could result in an image being generated showing avatars of the users covered in mud. Furthermore, information from users' electronic communications between each other and/or social network posts can be used to identify an event attended by the user and use such information to generate avatar attributes and images.

In some exemplary embodiments, the system can identify users at a common location, generate images containing the avatars of such users, and initiate (automatically or in response to user activation) the transmission of electronic communications to such users. For example, if a first user and second user attend an event (such as a baseball game at a stadium) together, the system (e.g., via the first user's mobile computing device) may (e.g., automatically with the first user's authorization or in response to the first user's instruction) search for other users in the contact list of the first user's mobile device who are also at the stadium. In response to identifying a third user, the system may then generate an image containing avatars representing the first, second, and third users (e.g., all wearing team jerseys) and transmit an electronic message/communication containing the image (e.g., a part of a media overlay) to a mobile computing device carried by the third user (e.g., in a text message). Among other things, this can help users quickly identify and reach out to people they know at various events and locations.

Embodiments of the present disclosure may transmit (432) and/or receive (434) electronic communications containing images with avatars, including within media overlays. Any form of electronic communication may be utilized by embodiments of the present disclosure, such as SMS texts, MMS texts, emails, and other communications. Images included in such communications may be provided as attachments, displayed inline in the message, within media overlays, or conveyed in any other suitable manner.

In some embodiments, the system may generate a plurality of images containing one or more avatars and allow a user of the system to select which image(s) he/she wishes to include in an electronic communication and/or in a media overlay. In some embodiments, the generation of such images may be based on the content of communications sent or received by the system, as well as on other communication data as discussed above. In one particular embodiment, a computing device operated by a first user receives (434) an electronic communication from the computing device of a second user, where the communication contains an image that includes avatars representing the first and second user. In this example, the computing device of the first user is adapted to utilize the received image in generating (as in step 406 from FIG. 4A) a media overlay.

As described in more detail above, embodiments of the disclosure may generate an event story or event gallery (436) based on a collection or series of electronic communications (e.g., containing media content items with media overlays applied) between users and provide temporary access to the event story or gallery (438). Any collection of such communications may be selected based on any criteria, and one or more users may be granted access to an event story or gallery for any desired predetermined period of time. Likewise, the system may grant access to images generated by the system or received from other system for a predetermined period of time as described above. Such images may also be presented in conjunction with a media overlay (e.g., a SNAPCHAT filter).

Software Architecture

Figure 6:
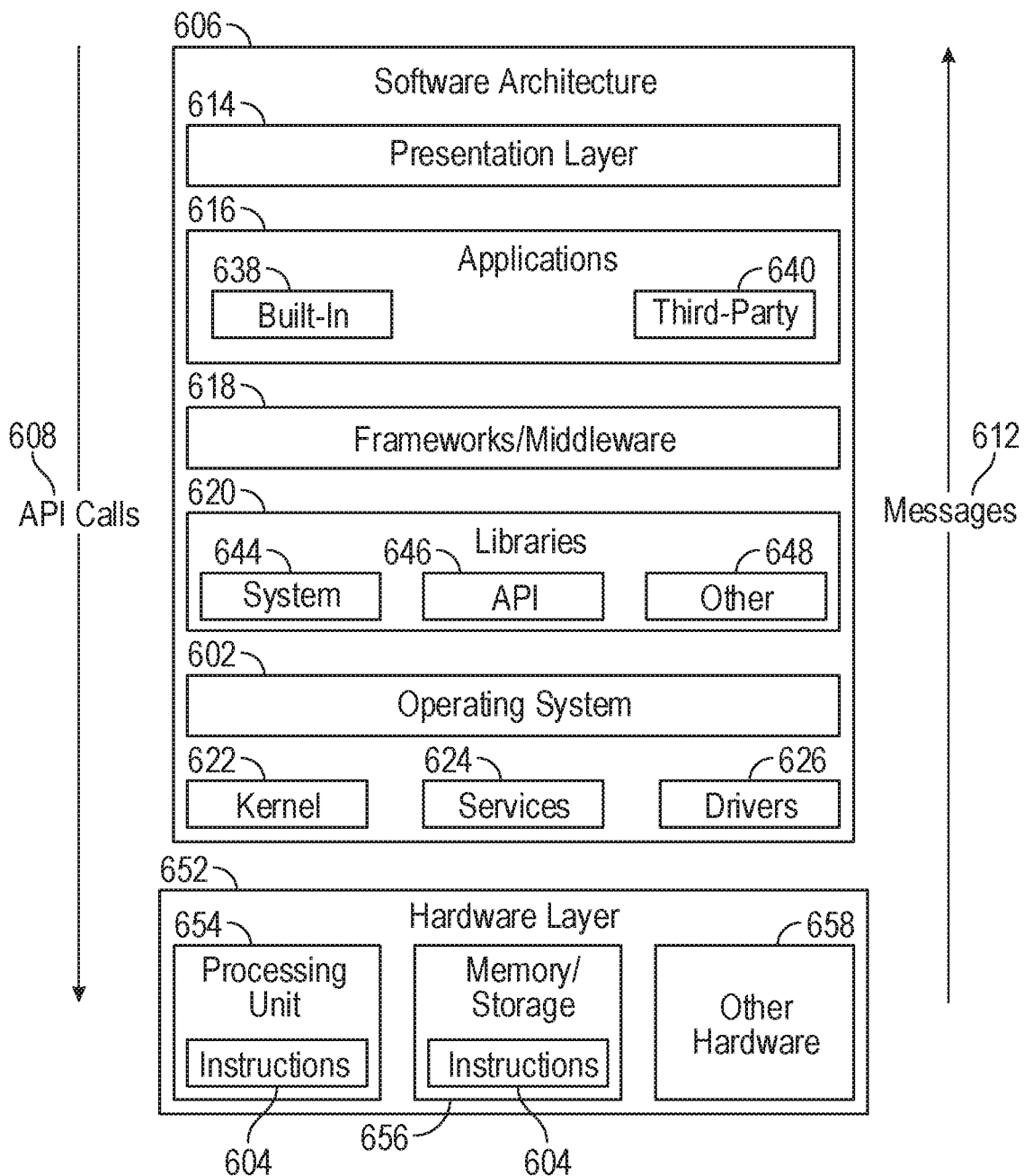
FIG. 6 is a block diagram illustrating a representative software architecture, which may be used in conjunction with various hardware architectures herein described.

FIG. 6 is a block diagram illustrating an exemplary software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or storage modules memory/storage 656, which also have executable instructions 604. The hardware layer 652 may also comprise other hardware 658.

As used herein, the term "component" may refer to a device, physical entity or logic having boundaries defined by function or subroutine calls, branch points, application program interfaces (APIs), and/or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various exemplary embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations.

A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

A processor may be, or in include, any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access.

For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some exemplary embodiments, the processors or processor-implemented components may be located in a single geographic location (e.g., within a home environment, an office environment, or a server farm). In other exemplary embodiments, the processors or processor-implemented components may be distributed across a number of geographic locations.

In the exemplary architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) API calls 608 through the software stack and receive messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be utilized by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems interactions with a user may occur through a presentation layer, such as presentation layer 614. In these systems, the application/component "logic" can be separated from the aspects of the application/component that interact with a user.

FIG. 7 is a block diagram illustrating components (also referred to herein as "modules") of a machine 700, according to some exemplary embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

As used herein, the term "machine-readable medium," "computer-readable medium." or the like may refer to any component, device or other tangible media able to store instructions and data temporarily or permanently. Examples of such media may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" may also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" may refer to a single storage apparatus or device, as well as "cloud-based" storage systems or storage networks that include multiple storage apparatus or devices. The term "machine-readable medium" excludes signals per se.

The I/O components 718 may include a wide variety of components to provide a user interface for receiving input, providing output, producing output, transmitting information, exchanging information, capturing measurements, and so on. The specific I/O components 718 that are included in the user interface of a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various exemplary embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 728 may also include one or more image-capturing devices, such as a digital camera for generating digital images and/or video.

In further exemplary embodiments, the I/O components 718 may include biometric components 730, motion components 734, environmental environment components 736, or position components 738, as well as a wide array of other components. One or more of such components (or portions thereof) may collectively be referred to herein as a "sensor component" or "sensor" for collecting various data related to the machine 700, the environment of the machine 700, a user of the machine 700, or a combinations thereof.

For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, velocity sensor components (e.g., speedometer), rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position system (GPS) receiver component), altitude sensor components (e.g., altimeters or barometers that detect air pressure from which altitude may be derived), orientation sensor components (e.g., magnetometers), and the like. For example, the location sensor component may provide location information associated with the system 700, such as the system's 700 GPS coordinates and/or information regarding a location the system 700 is at currently (e.g., the name of a restaurant or other business).

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components. Bluetooth® components (e.g., Bluetooth® Low Energy). Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Where a phrase similar to "at least one of A. B, or C," "at least one of A, B, and C," "one or more A. B, or C," or "one or more of A. B, and C" is used, it is intended that the phrase be interpreted to mean that A alone may be present in an embodiment, B alone may be present in an embodiment. C alone may be present in an embodiment, or that any combination of the elements A, B and C may be present in a single embodiment; for example, A and B, A and C, B and C, or A and B and C.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2016, SNAPCHAT. INC. 2016. All Rights Reserved.

Changes and modifications may be made to the disclosed embodiments without departing from the scope of the present disclosure. These and other changes or modifications are intended to be included within the scope of the present disclosure, as expressed in the following claims.

What is claimed is:

1. A system comprising:
a processor;
a user interface coupled to the processor, the user interface comprising an input device and a display screen; and
memory coupled to the processor and storing instructions that, when executed by the processor, cause the processor to perform operations comprising:
receiving a media content item;
generating a plurality of media overlays that each comprise an avatar of a user, wherein the avatar of the user is a visual representation of the user, wherein an appearance of the avatar of the user is generated to reflect themes of the plurality of media overlays, wherein the appearance of the avatar of the user is different in each of the media overlays;
causing a plurality of selectable items associated with the plurality of media overlays to be displayed on the display screen, wherein the selectable items are included in a gallery or carrousel;
receiving a selection, via the input device, of a first selectable item included in the plurality of selectable items, wherein the first selectable item corresponds to a first media overlay included in the plurality of media overlays;
in response to receiving the selection, generating a modified media content item by incorporating the first media overlay including the avatar of the user with the media content item, wherein incorporating the first media overlay with the media content item comprises overlaying the first media overlay on the media content item; and
causing the modified media content item to be displayed on the display screen.

2. The system of claim 1, wherein the media content item is an image or a video.

3. The system of claim 1, wherein the system further comprises:
an image capturing device, and wherein the media content item is received from the image capturing device.

4. The system of claim 1, wherein the media content item is received from a computing device over a network.

5. The system of claim 1, wherein generating the plurality of media overlays is further based on at least one of: location information, an event, a time of day, or a date, and wherein the appearance of the avatar of the user in each of the media overlays is modified based on at least one of the location information, the event, the time of day, or the date.

6. The system of claim 5, wherein generating the plurality of media overlays based on the time of day includes identifying time information or time zone information from a clock operating on the system.

7. The system of claim 5, wherein generating the plurality of media overlays based on the location information includes identifying a location from a location sensor coupled to the processor.

8. The system of claim 1, wherein generating the plurality of media overlays includes modifying a setting of the media overlay or modifying the avatar of the user.

9. The system of claim 1, wherein generating the plurality of media overlays includes providing access to the media overlays by the user for a predetermined time period.

10. The system of claim 1, wherein the operations further comprise:
retrieving sensor information from a sensor component coupled with the processor, and wherein generating the plurality of media overlays is further based on the sensor information.

11. The system of claim 10, wherein the sensor component includes at least one of: a temperature sensor, a velocity sensor, an acceleration sensor, and an altitude sensor.

12. The system of claim 1, wherein the operations further comprise:
receiving a selection of a second media overlay from the plurality of media overlays from the input device, and
wherein generating the modified media content item includes overlaying the first media overlay and the second media overlay on the media content item.

13. The system of claim 1, wherein the operations further comprise:
in response to the selection of the first selectable item corresponding to the first media overlay, removing a second media overlay from the plurality of media overlays displayed to the user via the display screen of the user interface.

14. The system of claim 1, wherein the operations further comprise:
storing a history of media content items with applied media overlays in a database in communication with the system.

15. The system of claim 14, wherein the operations further comprise:
retrieving the history of media content items with applied media overlays from the database; and
causing the history of media content items to be displayed on the display screen of the user interface.

16. The system of claim 15, wherein the first media content item displayed in the history of media content items has a media content overlay with a previous version of the user's avatar, and wherein displaying the history of media content items includes displaying the first media content item with a current version of the user's avatar.

17. The system of claim 1, wherein the operations further comprise:
generating text for each of the plurality of media overlays, wherein each of the media overlays includes the generated text.

18. The system of claim 17, wherein generating the text for each of the media overlays includes:
identifying a location based on information from a location sensor coupled to the processor;
identifying a language associated with the location; and
generating the text in the media overlays in the identified language.

19. The system of claim 1, wherein generating the media overlay includes:
transmitting, to a server over a network, a request for the plurality of media overlays, the request including avatar characteristics associated with the user; and
receiving, from the server over the network, the plurality of media overlays each comprising the avatar of the user.

20. A computer-implemented method comprising:
receiving, by a processor, a media content item;
generating, by the processor, a plurality of media overlays that each comprises an avatar of the user, wherein the avatar of the user is a visual representation of the user, wherein an appearance of the avatar of the user is generated to reflect themes of the plurality of media overlays, wherein the appearance of the avatar of the user is different in each of the media overlays;
causing, by the processor, a plurality of selectable items associated with the plurality of media overlays to be displayed on the display screen, wherein the selectable items are included in a gallery or carrousel;
receiving a selection, by the processor from the input device, of a first selectable item included in the plurality of selectable items, wherein the first selectable item corresponds to a first media overlay included in the plurality of media overlays;
in response to receiving the selection, generating, by the processor, a modified media content item by incorporating the first media overlay including the avatar of the user with the media content item, wherein incorporating the first media overlay with the media content item comprises overlaying the first media overlay on the media content item; and
causing, by the processor, the modified media content item to be displayed on a display screen of a user interface.

21. A non-transitory computer-readable medium storing instructions that, when executed by a processor, cause the processor to perform operations comprising:
receiving a media content item;
generating a plurality of media overlays that each comprise an avatar of a user, wherein the avatar of the user is a visual representation of the user, wherein an appearance of the avatar of the user is generated to reflect themes of the plurality of media overlays, wherein the appearance of the avatar of the user is different in each of the media overlays;
causing a plurality of selectable items associated with the plurality of media overlays to be displayed on the display screen, wherein the selectable items are included in a gallery or carrousel;
receiving a selection, via the input device, of a first selectable item included in the plurality of selectable items, wherein the first selectable item corresponds to a first media overlay included in the plurality of media overlays;
in response to receiving the selection, generating a modified media content item by incorporating the first media overlay including the avatar of the user with the media content item, wherein incorporating the first media overlay with the media content item comprises overlaying the first media overlay on the media content item; and causing the modified media content item to be displayed on a display screen of a user interface.

\* \* \* \* \*